(12) United States Patent
Yoshida et al.

(10) Patent No.: US 7,393,808 B2
(45) Date of Patent: Jul. 1, 2008

(54) PARTICULATE MATTER-OXIDIZING MATERIAL AND OXIDIZING CATALYST

(75) Inventors: Kohei Yoshida, Susono (JP); Shinichi Takeshima, Mishima (JP)

(73) Assignee: Toyota Jisdosha Kabushiki Kaisha, Toyota (JP)

( * ) Notice: Subject to any disclaimer, the term of this patent is extended or adjusted under 35 U.S.C. 154(b) by 70 days.

(21) Appl. No.: 10/983,036

(22) Filed: Nov. 8, 2004

(65) Prior Publication Data

US 2005/0119117 A1 Jun. 2, 2005

Related U.S. Application Data

(63) Continuation of application No. PCT/JP03/05907, filed on May 12, 2003.

(30) Foreign Application Priority Data

May 15, 2002 (JP) .............................. 2002-140317

(51) Int. Cl.
*B01J 23/00* (2006.01)
*B01J 23/10* (2006.01)

(52) U.S. Cl. ................. 502/304; 502/302; 502/303; 502/349

(58) Field of Classification Search ......... 502/302–304, 502/439, 349
See application file for complete search history.

(56) References Cited

U.S. PATENT DOCUMENTS

| | | | |
|---|---|---|---|
| 5,000,929 A | 3/1991 | Horiuchi et al. | |
| 5,571,492 A * | 11/1996 | Yao et al. .................... | 423/263 |
| 5,580,536 A * | 12/1996 | Yao et al. .................... | 423/263 |
| 5,888,464 A * | 3/1999 | Wu et al. .................... | 423/213.5 |
| 6,150,288 A * | 11/2000 | Suzuki et al. ................ | 501/105 |
| 6,228,799 B1 * | 5/2001 | Aubert et al. ............... | 502/304 |
| 6,261,989 B1 * | 7/2001 | Tanaka et al. ............... | 502/217 |
| 6,306,794 B1 * | 10/2001 | Suzuki et al. ............... | 502/304 |
| 6,355,220 B1 * | 3/2002 | Blanchard et al. .......... | 423/242.1 |
| 6,358,880 B1 * | 3/2002 | Hedouin et al. ............. | 502/302 |
| 6,387,338 B1 * | 5/2002 | Anatoly et al. ............. | 423/239.1 |
| 6,399,537 B1 * | 6/2002 | Graham ....................... | 502/304 |
| 6,464,946 B1 * | 10/2002 | Yamada et al. .............. | 422/177 |
| 6,528,451 B2 * | 3/2003 | Brezny et al. ............... | 502/304 |
| 6,555,081 B2 * | 4/2003 | Hori et al. ................ | 423/239.1 |
| 6,620,762 B2 * | 9/2003 | Tan et al. .................... | 502/304 |
| 6,682,706 B1 * | 1/2004 | Yamamoto et al. .......... | 422/180 |
| 6,790,807 B2 * | 9/2004 | Woodhead ................... | 502/302 |
| 6,797,668 B2 * | 9/2004 | Yoshikawa .................. | 502/304 |
| 6,808,687 B1 * | 10/2004 | Uenishi et al. .............. | 422/177 |
| 6,831,036 B1 * | 12/2004 | Yamazaki et al. ........... | 502/327 |
| 6,864,214 B2 * | 3/2005 | Uenishi et al. .............. | 502/304 |
| 6,881,384 B1 * | 4/2005 | Uenishi et al. .............. | 422/177 |
| 6,893,998 B2 * | 5/2005 | Shigapov et al. ........... | 502/327 |
| 6,906,002 B2 * | 6/2005 | Takeshima et al. .......... | 502/327 |
| 6,933,259 B2 * | 8/2005 | Hatanaka et al. ............ | 502/240 |
| 2001/0036901 A1 * | 11/2001 | Koda et al. .................. | 502/304 |
| 2002/0061816 A1 * | 5/2002 | Uenishi et al. .............. | 502/304 |
| 2002/0107141 A1 * | 8/2002 | Yoshikawa .................. | 502/304 |
| 2003/0004060 A1 * | 1/2003 | Shigapov et al. ........... | 502/304 |
| 2004/0120865 A1 * | 6/2004 | Yamamoto et al. .......... | 422/177 |

FOREIGN PATENT DOCUMENTS

| | | |
|---|---|---|
| EP | 1 208 903 A2 | 5/2002 |
| JP | A 2-75342 | 3/1990 |
| JP | A 9-131530 | 5/1997 |
| JP | A 11-19514 | 1/1999 |
| JP | A 2000-176282 | 6/2000 |
| JP | A 2001-271634 | 10/2001 |
| JP | A 2003-144923 | 5/2003 |

* cited by examiner

*Primary Examiner*—Cam N. Nguyen
(74) *Attorney, Agent, or Firm*—Oliff & Berridge PLC

(57) ABSTRACT

A particulate matter-oxidizing material which enhances the rate of oxidizing the particulate matter at low temperatures (not higher than about 300° C.), and of which the action for purifying NOx by reduction at high temperatures (not lower than about 500° C.) is not impaired by the oxidizing action. The oxidizing material contains a cerium-zirconium composite oxide for purifying, by burning, the particulate matter in the exhaust gas from a lean-burn internal combustion engine, wherein the cerium-zirconium composite oxide contains cerium in an amount of 0.1 to 20 mol % based on the total mol number of metal atoms that are contained. Desirably, the cerium-zirconium composite oxide further contains at least one kind of metal (M) selected from the rare earth metals (excluding cerium), and the molar ratio of M/Ce is 0.1 to 10.

5 Claims, 22 Drawing Sheets

PRIOR ART

PARTICULATE MATTER-OXIDIZING MATERIAL AND OXIDIZING CATALYST

CROSS-REFERENCE TO RELATED APPLICATIONS

Figure 1:
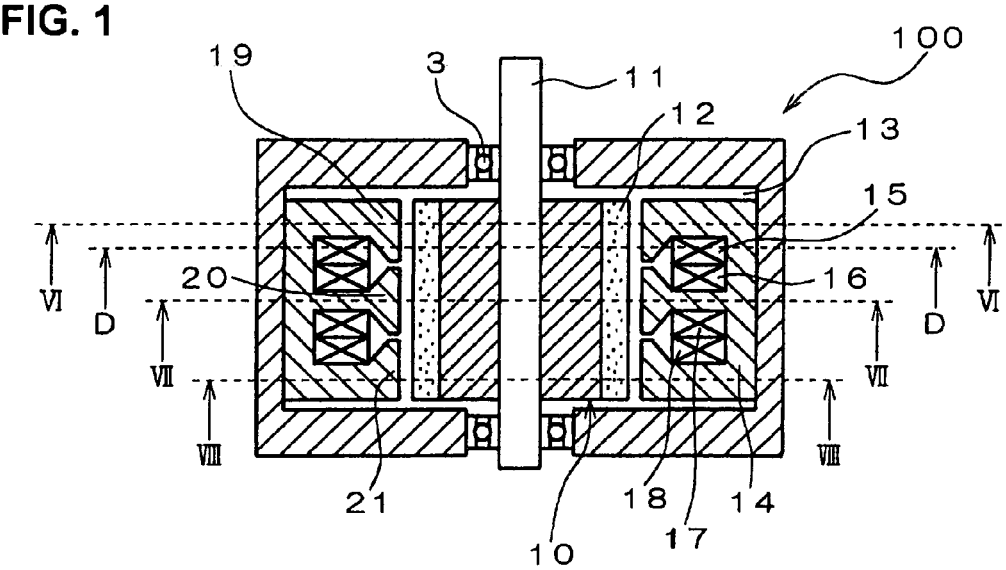

This application is based upon and claims priority of Japanese Patent Application No. 2002-140317, filed on May 15, 2002, the contents being incorporated herein by reference, and a continuation of PCT/JP03/05907.

TECHNICAL FIELD

The present invention relates to a particulate matter-oxidizing material which exhibits a high performance for purifying, by oxidation, the particulate matter (PM) contained in the exhaust gas emitted from a lean-burn internal combustion engine such as a diesel engine, and a catalyst for oxidizing the particulate matter.

BACKGROUND ART

For protecting the environment, it is required, worldwide, to suppress the amount of carbon dioxide ($CO_2$) emitted from the internal combustion engines such as automotive engines and to suppress the amount of nitrogen oxides (NOx) emitted.

A lean-burn internal combustion engine such as a diesel engine has a feature of emitting $CO_2$ in small amounts owing to its high thermal efficiency accompanied, however, by the defects of emitting NOx in relatively large amounts and, further, producing particulate matter.

It is, therefore, important to decrease both the NOx and the particulate matter in the exhaust gas emitted from the lean-burn internal combustion engines such as diesel engines, and development and improvement have continued concerning the technology for burning fuels, concerning the technology for reforming fuels and concerning the technology for after-treatment.

To cope with these problems, the present applicant has proposed, in Japanese Unexamined Patent Publication (Kokai) No. 2001-271634, an exhaust gas purification system (DPNR) of the type of continuous regeneration which purifies both the NOx and the particulate matter relying on a combination of controlling the air-fuel ratio in the combustion system with a particular catalyst.

According to this system, a lean-burn condition of a high air-fuel ratio (lean) is established for the steady operation, an instantaneous burning condition of a low air-fuel ratio (rich) is established intermittently, the particulate matter is purified, by burning, by utilizing active oxygen generated by a particular catalyst accompanying a variation in the composition of the exhaust gas and, at the same, the NOx is purified by reduction.

The above system essentially requires the development of a particulate matter-oxidizing material which is capable of exhibiting a particulate matter-oxidizing action from a low temperature (not higher than about 300° C.) so that the particulate matter will not be excessively accumulated on the filter under practical operating conditions, and of which the action for purifying NOx by reduction will not be impaired by the oxidizing action.

Ceria has been known for its function as an oxidizing catalyst. For example, Japanese Unexamined Patent Publication (Kokai) No. 10-151348 discloses a particulate matter-oxidizing catalyst using at least either a cerium oxide or a zirconium oxide as a substrate.

There has further been known that a cerium-zirconium composite oxide has an oxygen storage capability (OSC); i.e., Ce atoms contained therein are capable of changing the valency between a valency of 3 and a valency of 4, such as changing the valency from 3 to 4 in an oxidizing atmosphere where $O_2$ is contained in relatively large amounts to absorb oxygen, and changing the valency from 4 to 3 in a reducing atmosphere where CO and HC are contained in relatively large amounts to release oxygen.

Prior arts of the cerium-zirconium composite oxides have been taught in Japanese Unexamined Patent Publications (Kokai) Nos. 2000-169148 and 10-212122, and it has been described that the optimum cerium-zirconium composite oxides which are the OSC materials, usually, contain cerium in an amount as large as about 50 mol %.

It is an object of the present invention to provide a particulate matter-oxidizing material adapted to the system proposed above by the present applicant by utilizing, as a particulate matter-oxidizing material, a cerium-zirconium composite oxide of a composition different from the cerium-zirconium composite oxides proposed by the above prior arts.

Concretely speaking, it is an object of this invention to provide a particulate matter-oxidizing material which enhances the rate of oxidizing the particulate matter at low temperatures (not higher than about 300° C.) which is necessary in the exhaust gas purification system proposed by the present applicant and in other exhaust gas purification systems, and of which the action for purifying NOx by reduction at high temperatures (not lower than about 500° C.) will not be impaired by the oxidizing action.

DISCLOSURE OF THE INVENTION

The above object is achieved by a particulate matter-oxidizing material containing a cerium-zirconium composite oxide for purifying, by burning, the particulate matter in the exhaust gas from a lean-burn internal combustion engine, wherein said cerium-zirconium composite oxide contains cerium in an amount of 0.1 to 20 mol % based on the total mol number of metal atoms that are contained.

The particulate matter-oxidizing material of the present invention has a feature in that the cerium-zirconium composite oxide is used as a particulate matter-oxidizing material, and the cerium-zirconium composite oxide contains cerium in an amount of 0.1 to 20 mol %, i.e., contains cerium in an amount which is much smaller than the amount in the cerium-zirconium composite oxide used in the conventional OSC materials.

BEST MODE FOR CARRYING OUT THE INVENTION

In a system (DPNR) for simultaneously purifying both the NOx and the particulate matter proposed by the present applicant, it is considered that the cerium-zirconium composite oxide forms active oxygen ($O_2^-$) in a manner as described below and active oxygen promotes the burning of the particulate matter.

In a lean steady operation, the Ce atoms in the cerium-zirconium composite oxide have a valency of 4. In an instantaneous rich period, some Ce atoms release O atoms to assume a valency of 3. The Ce atoms having the valency of 3 are in an excited state of a high energy level. Upon coming in contact with the Ce atoms of this high energy level, the oxygen molecules contained in the exhaust gas turn into active oxygen ($O_2^-$) of a high energy level.

That is, the cerium-zirconium composite oxide becomes a source of forming active oxygen which is capable of oxidizing the particulate matter even from low temperatures (not higher than about 300° C.). It can therefore be expected to provide an oxidizing material capable of generating active oxygen in large amounts even at low temperatures.

Here, active oxygen can be generated in increased amounts even by increasing the amount of the cerium-zirconium composite oxide. However, if the amount of the conventional cerium-zirconium composite oxide having a high cerium content increases, the oxygen occluding amount increases proportionally to form an oxidizing atmosphere under a rich condition causing a problem of impairing the purification of NOx by reduction at high temperatures (not lower than about 500° C.).

On the other hand, it has been discovered that the cerium-zirconium composite oxide having a low cerium content specified by the present invention enables the particulate matter to be oxidized at a very high rate in a state where the oxygen occluding amount at the same high temperature is the same as that of the conventional cerium-zirconium composite oxide having a high cerium content as will be demonstrated later by way of Examples.

If described in further detail, it has been discovered that the cerium-zirconium composite oxide having a cerium content in a low range enables the particulate matter to be oxidized at a rate much higher than that of the cerium-zirconium composite oxide having a high cerium content under a condition where the amount of the composite oxide is increased to equalize the oxygen occluding amount at high temperatures, i.e., under the condition where the effect on reducing the NOx by reduction is equalized. It has, therefore, been found that the above cerium-zirconium composite oxide is suited for the exhaust gas purification system proposed above by the present applicant for reducing NOx while, at the same time, oxidizing the particulate matter.

Though the reasons have not yet been clarified, it is presumed that, as the cerium content is low, the distance increases among the trivalent Ce atoms which serve as a source of generating active oxygen resulting in an increase in the mutual action of the active oxygen that is generated. Further, with the amount of cerium being set to be the same, the absolute amount of the cerium-zirconium composite oxide increases whereby the volume of active oxygen that is generated increases and the contacting efficiency is enhanced between the active oxygen and the particulate matter.

As a preferred embodiment, the cerium-zirconium composite oxide further contains at least one kind of metal (M) selected from the rare earth metals (excluding cerium) and, preferably, contains at least one kind of metal (M) selected from lanthanum, samarium, neodymium, gadolinium, scandium and yttrium. Preferably, further, the molar ratio of M/Ce is 0.1 to 10 and, more preferably, 0.2 to 5.

In the cerium-zirconium composite oxide containing the above rare earth metals in a particular range, the trivalent Ce atoms that are generated during the rich burning condition maintain stability and account for the formation of large amounts of active oxygen even at low temperatures.

As a preferred embodiment, the above particular cerium-zirconium composite oxide contains a cerium-free oxide at a mass ratio of cerium-zirconium composite oxide/cerium-free oxide of 2/8 to 8/2, preferably, 3/7 to 7/3. Preferably, these oxides are substantially homogeneously mixed together to constitute a particulate matter-oxidizing material.

Due to the above mixing, it is estimated that the apparent volume of active oxygen that is generated increases, and the distance is shortened between the generating sources and the particulate matter to enhance the contacting efficiency between the active oxygen and the particulate matter.

In the particulate matter-oxidizing material of the present invention, a noble metal is carried on a monolithic base material which has a particulate matter-trapping function to constitute a particulate matter-oxidizing catalyst. The particulate matter-oxidizing catalyst is used for an exhaust gas purifying system proposed by the present applicant to efficiently purify both NOx and particulate matter.

The particulate matter-oxidizing material of the invention contains the cerium-zirconium composite oxide that contains cerium in an amount of 0.1 to 20 mol % based on the total mol number of metal atoms. Preferably, the cerium-zirconium composite oxide contains at least one kind of metal selected from the rare earth metals (excluding cerium) and, more preferably, at least one kind of metal selected from lanthanum (La), samarium (Sm), neodymium (Nd), gadolinium (Gd), scandium (Sc) and yttrium (Y).

The cerium-zirconium composite oxide can be produced by various methods by, for example, mixing a ceria precursor such as cerium hydroxide $Ce(OH)_3$, cerium nitrate $Ce(NO_3)_3$, cerium chloride $CeCl_3$ or cerium acetate $Ce(CH_3CO_2)_3$, a zirconia precursor such as zirconium hydroxide $Zr(OH)_3$, zirconium oxynitrate $ZrO(NO_3)_2 \cdot 2H_2O$ or zirconium chloride $ZrCl_4$ and, as required, nitrates of rare earth elements to prepare a slurry or a solution thereof, followed by drying and, then, by firing in an open atmosphere at 500 to 1000° C.

Then, preferably, the obtained cerium-zirconium composite oxide is finely pulverized by milling to a level of a diameter of about 1 μm so as to be used as a particulate matter-oxidizing material.

According to the above method of preparation, the ratio of the starting materials is adjusted to easily form the cerium-zirconium composite oxide in which the molar ratio of cerium/zirconium/rare earth metal is adjusted to lie within a predetermined range.

As a preferred embodiment, the cerium-zirconium composite oxide contains a cerium-free oxide at a mass ratio of cerium-zirconium composite oxide/cerium-free oxide of 2/8 to 8/2, and preferably, 3/7 to 7/3. Preferably, these oxides are substantially homogeneously mixed together.

As the cerium-free oxide, there can be exemplified alumina, silica, titania, zirconia, silica-alumina, titania-zirconia and zirconia-calcia preferably in the form of fine particles having an average particle size of not larger than 1 μm.

The cerium-zirconium composite oxide and the cerium-free oxide are mixed together at a predetermined ratio by using a ball mill or the like for a required period of time to obtain a substantially homogeneous mixture.

The obtained particulate matter-oxidizing material is carried by the monolithic base material which further carries a noble metal and, preferably, a NOx-occluding material to constitute a particulate matter-oxidizing catalyst. As the monolithic base material, there can be exemplified a honeycomb-shaped base material, such as cordierite, in which cells are alternately closed.

The particulate matter-oxidizing material is carried by the monolithic base material by, for example, adding a binder such as a zirconia sol or an alumina sol to the cerium-zirconia composite oxide and, further, adding thereto water in such an amount that a suitable degree of viscosity can be obtained, mixing them together and milling them to prepare a slurry, and wash-coating the monolithic base material with the slurry, followed by drying and firing.

Noble metals to be carried by the monolithic base materials are platinum (Pt), palladium (Pd) and rhodium (Rh). The noble metals are carried by carrying the particulate matter-oxidizing material, and impregnating the catalyst substrate structure with a solution containing a noble metal compound such as dinitrodiammineplatinum $Pt(NH_3)_2(NO_2)_2$, palladium nitrate $Pd(NO_3)_2$, or rhodium nitrate $Rh(NO_3)_3$, followed by drying and firing.

As the NOx-occluding material to be further carried by the monolithic base material, there can be exemplified at least one kind of an alkali metal such as lithium (Li), sodium (Na), potassium (K) or rubidium (Rb), or an alkaline earth metal such as magnesium (Mg), calcium (Ca), strontium (Sr) or barium (Ba). Preferably, there is used at least one kind of metal selected from Li, K and Ba.

The NOx-occluding material is suitably carried after the noble metals are carried. Like carrying noble metals, the catalyst substrate structure is impregnated with a solution of an acetate or a nitrate of the alkali metals, followed by drying and firing.

The invention will be described more concretely by way of working Examples.

EXAMPLES (1) Effect of the Cerium Content Upon the Rate of Oxidizing the Particulate Matter.

An aqueous solution of cerium nitrate was added in various amounts to the powders of zirconium hydroxide, and mixed together. The mixtures were dried at 80° C. for 12 hours and were fired at 550° C. for 2 hours. The obtained powders were milled for 8 hours.

Thus, there were prepared cerium-zirconium composite oxides $Ce_nZr_{1-n}O_2$ having nine values n of from 0.01 to 0.80.

To 100 parts by mass of each of these cerium-zirconium composite oxides were added 5 parts by mass of an alumina sol and a suitable amount of ion-exchanged water. The mixtures were mixed together by using a ball mill to prepare slurries containing the cerium-zirconium composite oxide.

Next, a monolithic base material such as cordierite in which the cells have been alternately closed (having an apparent volume of 50 cc and a cell density of about 300 cells/square inch) was wash-coated with each slurry, followed by drying, then, by firing in the open atmosphere at 500° C. for 2 hours. The monolithic base materials were further impregnated with an aqueous solution of a dinitrodiammineplatinum complex, fired at 500° C. for 2 hours to constitute particulate matter-oxidizing catalysts carrying the cerium-zirconium composite oxide and Pt on the monolithic base materials.

The cerium-zirconium composite oxides were measured for their oxygen-occluding amounts at 500° C. per a unit mass and were carried by the monolithic base materials in such amounts that the amounts of occluding oxygen were the same. Platinum, on the other hand, was carried in an amount of 2 g per liter of the monolithic base material.

The thus prepared particulate matter oxidizing catalysts were measured for their rates of oxidizing the particulate matter. The measurement was taken by introducing the exhaust gas (particulate matter passing amount of 0.036 g/min) from a diesel engine into each particulate matter oxidizing catalyst, increasing the amount of the exhaust gas, measuring the pressure differential before and after the particulate matter oxidizing catalyst, and measuring the amount of the exhaust gas with which the pressure differential was balanced. The flow-in rate of the particulate matter contained in the exhaust gas during the balanced period was regarded to be the rate of oxidizing the particulate matter by each particulate matter oxidizing catalyst.

The results were as shown in Table 1. In Table 1, the cerium-zirconium composite oxide $Ce_{0.5}Zr_{0.5}O_2$ having a representative cerium content which has heretofore been used as the OSC material, was used as a reference.

It will be seen from the results that the cerium-zirconium composite oxides of a composition specified by the present invention exhibit very high rates of oxidizing the particulate matter as compared to those of the conventional compositions while occluding oxygen in the same amount, i.e., purifying NOx by reduction in the same amount.

The oxygen-occluding amount measured for adjusting the amount of carrying each cerium-zirconium composite oxide was found from a difference between the amount of oxygen introduced and the amount of oxygen emitted by exposing the cerium-zirconium composite oxide to the reducing atmosphere at 500° C. and, then, repetitively and instantaneously exposing the cerium-zirconium composite oxide to the oxygen gas ($O_2$ concentration of 100%) of a predetermined amount. The present inventors have discovered that the thus measured oxygen-occluding amount is strongly correlated to the purification of NOx by reduction.

TABLE 1

Cerium contents and rates of PM oxidation

| Ce content (mol %) | Relative PM oxidizing rate |
|---|---|
| 80 | 1 |
| 50 | 1.1 |
| 20 | 1.5 |
| 15 | 1.9 |
| 10 | 2.3 |
| 7 | 2.5 |
| 5 | 2.1 |
| 3.5 | 2.0 |
| 1 | 1.5 |
| | (measured at 300° C.) |

(2) Effect of La Addition Upon the Rate of Oxidizing the Particulate Matter.

An aqueous solution of cerium nitrate and an aqueous solution of lanthanum nitrate were added in various amounts to the powders of zirconium hydroxide, and mixed together. The mixtures were dried at 80° C. for 12 hours and were fired at 550° C. for 2 hours. The obtained powders were milled for 8 hours.

Thus, there were prepared cerium-zirconium composite oxides $La_nCe_{0.07}Zr_{0.93-n}O_2$ having five values n of from 0.01 to 0.20.

These cerium-zirconium composite oxides were carried by the monolithic base materials such as of cordierite in the same manner as in (1) above. By using an aqueous solution of a dinitrodiammineplatinum complex, further, platinum was carried to constitute particulate matter-oxidizing catalysts.

Here, each cerium-zirconium composite oxide was carried by the monolithic base material in an amount of 80 g per liter of the monolithic base material, while platinum was carried in an amount of 2 g per liter of the monolithic base material.

The thus prepared particulate matter-oxidizing catalysts were measured for their rates of oxidizing the particulate matter in the same manner as in (1) above.

The results were as shown in Table 2. In Table 2, the cerium-zirconium composite oxide $Ce_{0.07}Zr_{0.93}O_2$ exhibiting the highest rate of oxidizing the particulate matter in (1) above was used as a reference.

It will be learned from the results that the cerium-zirconium composite oxides which contain lanthanum exhibit very high rates of oxidizing the particulate matter. The present inventors have discovered that if the cerium content is the same in the cerium-zirconium composite oxides, the oxygen-occluding amount is substantially the same per mol of the cerium-zirconium composite oxide, and the effect is substantially the same upon purifying NOx by reduction. Therefore, improving the rate of oxidizing the particulate matter by the addition of lanthanum is based on a prerequisite that the oxygen-occluding amount is substantially the same.

TABLE 2

Lanthanum contents and rates of PM oxidation

| La content (mol %) | Relative PM oxidizing rate |
|---|---|
| 0 | 1 |
| 1 | 1.1 |
| 3.5 | 1.5 |
| 7 | 2.4 |
| 13 | 3 |
| 20 | 1.9 |
| Ce content, 7 mol % | measured at 300° C. |

(3) Effect of Addition of Various Rare Earth Metals Upon the Rate of Oxidizing the Particulate Matter.

An aqueous solution of cerium nitrate and an aqueous solution of nitrate of rare earth elements were added to the powders of zirconium hydroxide, and mixed together. The mixtures were dried at 80° C. for 12 hours and were fired at 550° C. for 2 hours. The obtained powders were milled for 8 hours.

Thus, there were prepared four kinds of cerium-zirconium composite oxides $M_{0.07}Ce_{0.07}Zr_{0.86}O_2$, M being Sm, Nd, Gd and Y. These cerium-zirconium composite oxides were carried by the monolithic base materials such as of cordierite in the same manner as in (1) above. By using an aqueous solution of a dinitrodiammineplatinum complex, further, platinum was carried to constitute particulate matter-oxidizing catalysts.

Here, each cerium-zirconium composite oxide was carried by the monolithic base material in an amount of 80 g per liter of the monolithic base material, while platinum was carried in an amount of 2 g per liter of the monolithic base material.

The thus prepared particulate matter oxidizing catalysts were measured for their rates of oxidizing the particulate matter in the same manner as in (1) above.

The results were as shown in Table 3. In Table 3, the cerium-zirconium composite oxide $La_{0.07}Ce_{0.07}Zr_{0.86}O_2$ exhibiting the highest rate of oxidizing the particulate matter in (2) above was used as a reference.

It will be seen from the above results and results of Table 1 that the rate of oxidizing the particulate matter is improved even by adding any rare earth metal.

TABLE 3

Rare earth metals and rates of PM oxidation

| Element added | Relative PM oxidizing rate |
|---|---|
| La | 1 |
| Sm | 1.15 |
| Nd | 1.03 |
| Gd | 0.94 |
| Y | 0.85 |
| Added element, 7 mol % measured at 300° C. | Ce content, 7 mol % |

(4) Effect of Mixing a Cerium-Free Oxide Upon the Rate of Oxidizing the Particulate Matter.

γ-Alumina (specific surface area of about 180 m²/g) which is a cerium-free oxide was added in various amounts to the cerium-zirconium composite oxide $La_{0.07}Ce_{0.07}Zr_{0.86}O_2$ prepared in the same manner as in (3) above.

To 100 parts by mass of each of the thus obtained mixture powder were added 5 parts by mass of an alumina sol and a suitable amount of ion-exchanged water. The mixtures were mixed together by using a ball mill to prepare slurries. The monolithic base materials were wash-coated with the slurries in the same manner as in (1) above to carry the mixture powders. Then, by using an aqueous solution of a dinitrodiammineplatinum complex, platinum was carried to constitute particulate matter-oxidizing catalysts.

Here, the mixture powders were carried by the monolithic base materials in such amounts that the cerium-zirconium composite oxide was carried in an amount of 80 g per liter of the monolithic base material and platinum was carried in an amount of 2 g per liter of the monolithic base material.

The thus prepared particulate matter oxidizing catalysts were measured for their rates of oxidizing the particulate matter in the same manner as in (1) above.

The results were as shown in Table 4. In Table 4, the cerium-zirconium composite oxide $La_{0.07}Ce_{0.07}Zr_{0.86}O_2$ not containing γ-alumina was used as a reference.

It will be seen from the results that the rate of oxidizing the particulate matter is very much increased by the addition of the cerium-free oxide.

TABLE 4

Mixing of cerium-free oxides and rates of PM oxidation

| $La_{0.07}Ce_{0.07}Z_{0.86}O_2$/γ-alumina | Relative PM oxidizing rate |
|---|---|
| 0/100 | 1 |
| 10/90 | 2 |
| 20/80 | 2.6 |
| 30/70 | 3.2 |
| 40/60 | 4.2 |
| 50/50 | 4.4 |
| 60/40 | 3.8 |
| 70/30 | 3.4 |
| 80/20 | 3.0 |
| | measured at 300° C. |

(5) Effect of the Pt Carrying Amount Upon the Rate of Oxidizing the Particulate Matter.

The cerium-zirconium composite oxide $La_{0.07}Ce_{0.07}Zr_{0.86}O_2$ prepared in the same manner as in (3) above and γ-Alumina were mixed together at a mass ratio of 6:4 by using a ball mill. To 100 parts by mass of the thus obtained mixture powder were added 5 parts by mass of an alumina sol and a suitable amount of ion-exchanged water. The mixtures were mixed together by using a ball mill to prepare slurries. The monolithic base materials were wash-coated with the slurries in the same manner as in (1) above to carry the mixed powders in an amount of 150 g per litter of the monolithic base material.

Then, by using an aqueous solution of a dinitrodiammineplatinum complex, platinum was carried in various amounts to constitute particulate matter-oxidizing catalysts.

The thus prepared particulate matter oxidizing catalysts were measured for their rates of oxidizing the particulate matter in the same manner as in (1) above. The results were as shown in Table 5. From the results of Table 5, it will be seen that the effect owing to an increase in the carrying amount is offset if the amount of carrying Pt exceeds a predetermined value.

TABLE 5

Amounts of Pt carried of and rates of PM oxidation

| Pt carrying amount (g/L) | Relative PM oxidizing rate |
|---|---|
| 1 | 1 |
| 1.5 | 1.56 |
| 2 | 2.6 |
| 2.5 | 2.7 |
| 3 | 2.7 |
| 5 | 2.7 | measured at 300° C.

(6) Effect of the Addition of NOx-Occluding Material Upon the Rate of Oxidizing the Particulate Matter.

A mixture powder of the cerium-zirconium composite oxide and the γ-alumina at a mass ratio of 6:4 was carried in an amount of 150 g per liter of the monolithic base material in the same manner as in (5) above.

Then, by using an aqueous solution of a dinitrodiammine-platinum complex, platinum was carried in various amounts. Further, the Pt-carrying cerium-zirconium composite oxide was impregnated with an aqueous solution of barium acetate and an aqueous solution of potassium acetate, followed by drying and, then, firing at 500° C. for one hour to carry barium in an amount of 0.3 mols and potassium in an amount of 0.1 mol per liter of the monolithic base material.

The thus prepared particulate matter-oxidizing catalysts were measured for their rates of oxidizing the particulate matter in the same manner as in (1) above. The results were as shown in Table 6. From Table 6, it will be seen that upon further carrying barium and potassium which are the NOx-occluding materials, the rate of oxidizing the particulate matter was improved to some extent.

TABLE 6

Addition of NOx-occluding materials and rates of PM oxidation

| NOx-occluding material | Relative PM oxidizing rate |
|---|---|
| no | 1 |
| yes | 1.05 | measured at 300° C.

According to the present invention as described above, there is provided a particulate matter-oxidizing material which enhances the rate of oxidizing the particulate matter at low temperatures (not higher than about 300° C.) without impairing the purification of NOx by reduction at high temperatures (not lower than about 500° C.) that is caused by the oxidizing action.

The invention claimed is:

1. A particulate matter-oxidizing material, comprising:
   a cerium-zirconium composite oxide for purifying, by burning, the particulate matter in the exhaust gas from a lean-burn internal combustion engine, wherein a lean-burn condition of a high air-fuel ratio is established for the steady operation and an instantaneous burning condition of a low air-fuel ratio is established intermittently, the cerium-zirconium composite oxide represented by the formula:

$Ce_nZr_{1-n}O_2$ wherein n is a number from 0.035 to 0.07.

2. The particulate matter-oxidizing material according to claim 1, further comprising:
   a cerium-free oxide, wherein a mass ratio of cerium-zirconium composite oxide/cerium-free oxide is from about 2/8 to about 8/2.

3. A particulate matter-oxidizing material, comprising:
   a cerium-zirconium composite oxide for purifying, by burning, the particulate matter in the exhaust gas from a lean-burn internal combustion engine, wherein a lean-burn condition of a high air-fuel ratio is established for the steady operation and an instantaneous burning condition of a low air-fuel ratio is established intermittently, the cerium-zirconium composite oxide represented by the formula:

$M_xCe_nZr_{1-n-x}O_2$ wherein:
   x is a number from 0.01 to 0.20;
   n is a number from 0.35 to 0.07; and
   M is at least one metal selected from the group consisting of the rare earth metals, excluding cerium.

4. The particulate matter-oxidizing material according to claim 3, wherein M is selected from the group consisting of lanthanum, samarium, neodymium, gadolinium, scandium, and yttrium.

5. The particulate matter-oxidizing material according to claim 3, wherein a molar ratio of M/Ce is in the range of 0.1 to 10.

* * * * *

UNITED STATES PATENT AND TRADEMARK OFFICE
CERTIFICATE OF CORRECTION

| | |
|---|---|
| PATENT NO. | : 7,393,808 B2 |
| APPLICATION NO. | : 10/983036 |
| DATED | : July 1, 2008 |
| INVENTOR(S) | : Kohei Yoshida |

It is certified that error appears in the above-identified patent and that said Letters Patent is hereby corrected as shown below:

On the Title Page,
Item (73) Assignee: "Toyota Jisdosha Kabushiki Kaisha", Assignee should read --Toyota Jidosha Kabushiki Kaisha--

On the Title Page,
Item (57) "5 Claims, 22 Drawing Sheets", should read --5 Claims--

Figure 2:
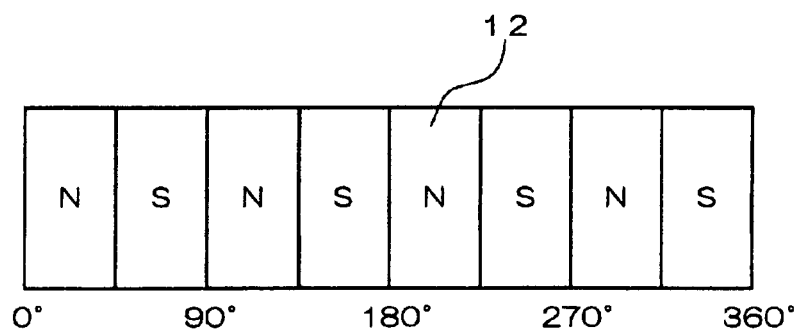
Figure 3:
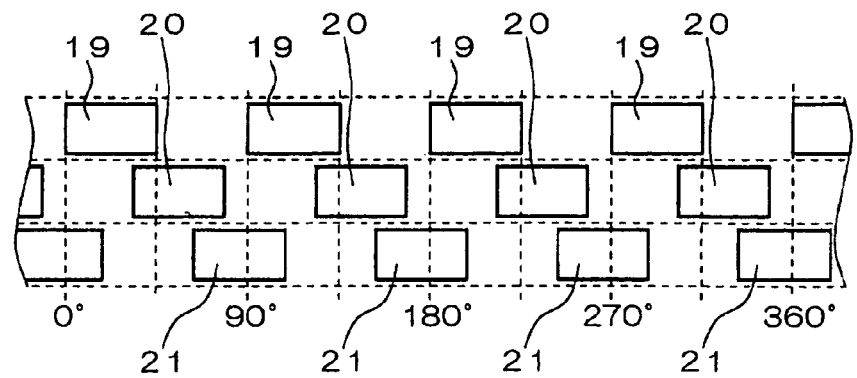
Figure 4:
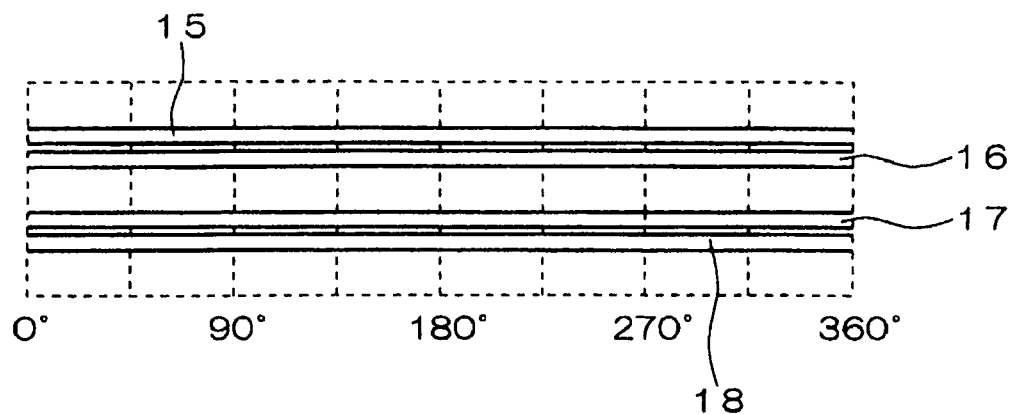
Figure 5:
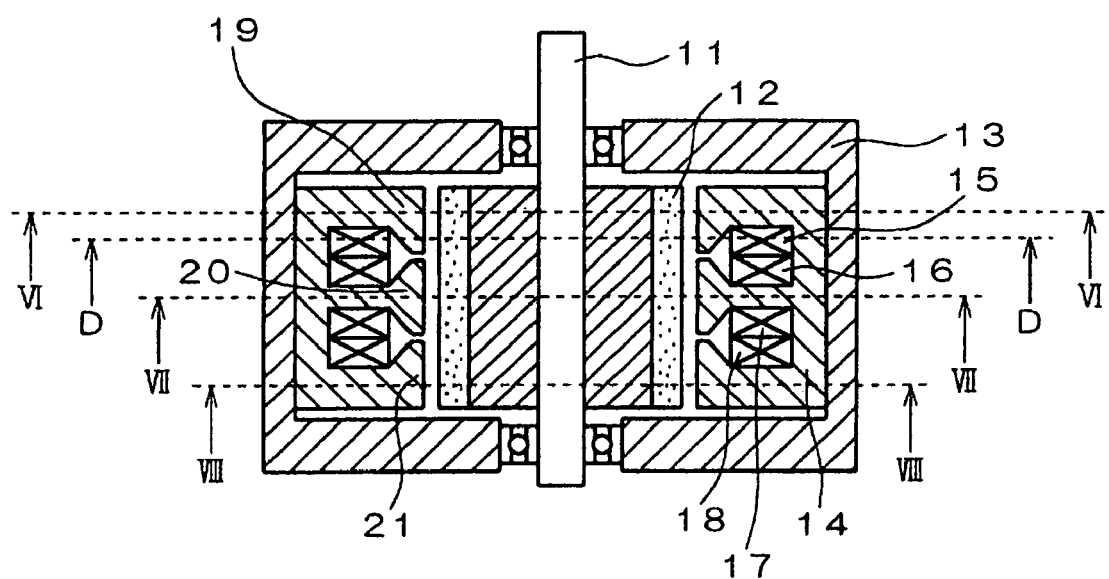
Figure 6:
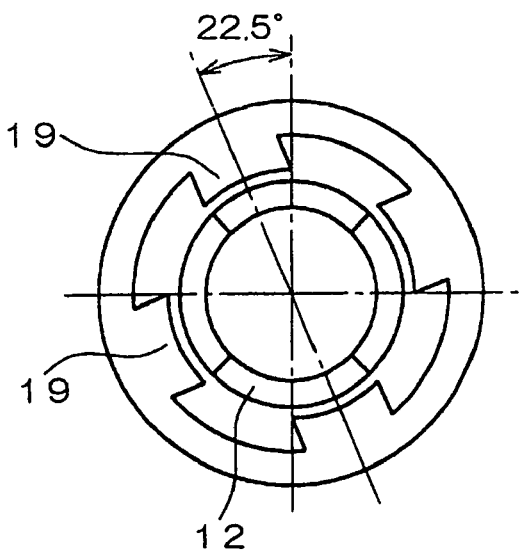
Figure 7:
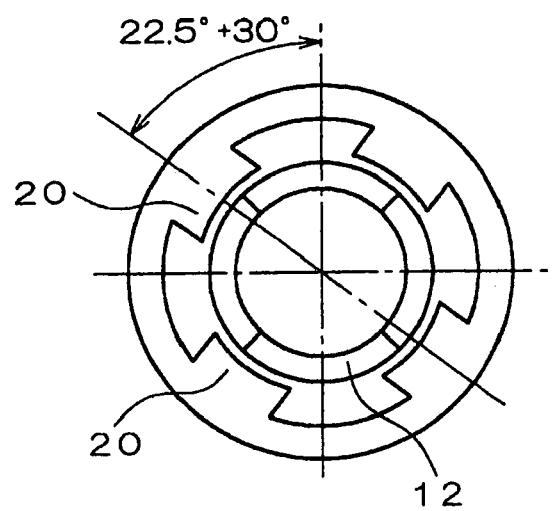
Figure 8:
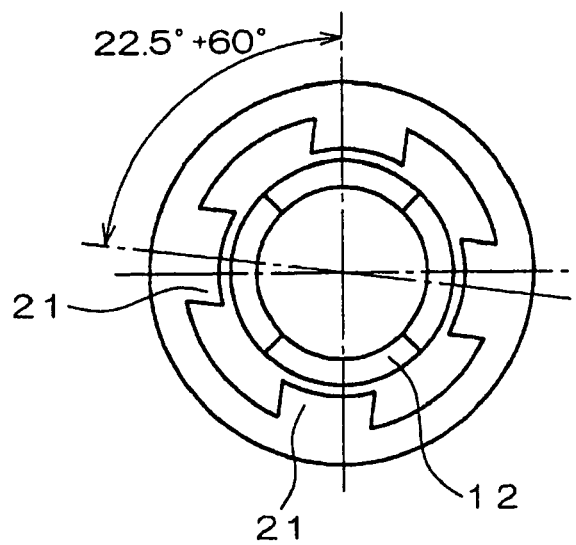
Figure 9:
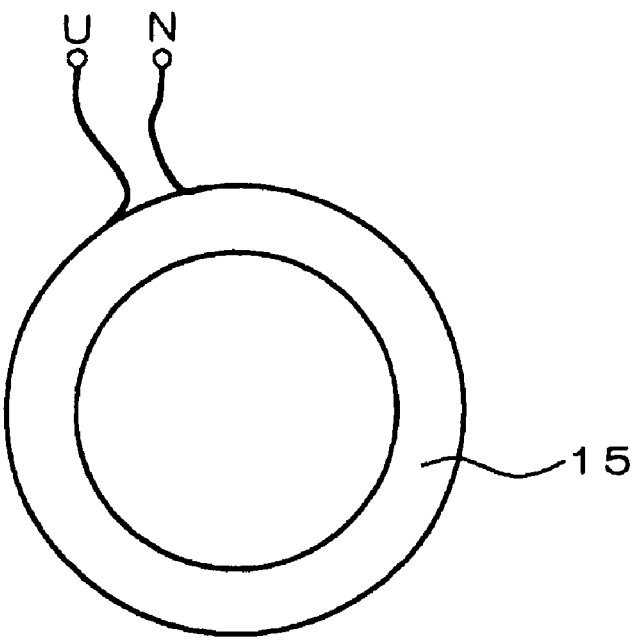
Figure 10:
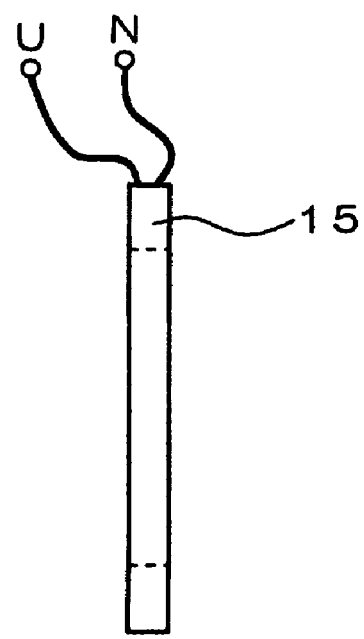
Figure 11:
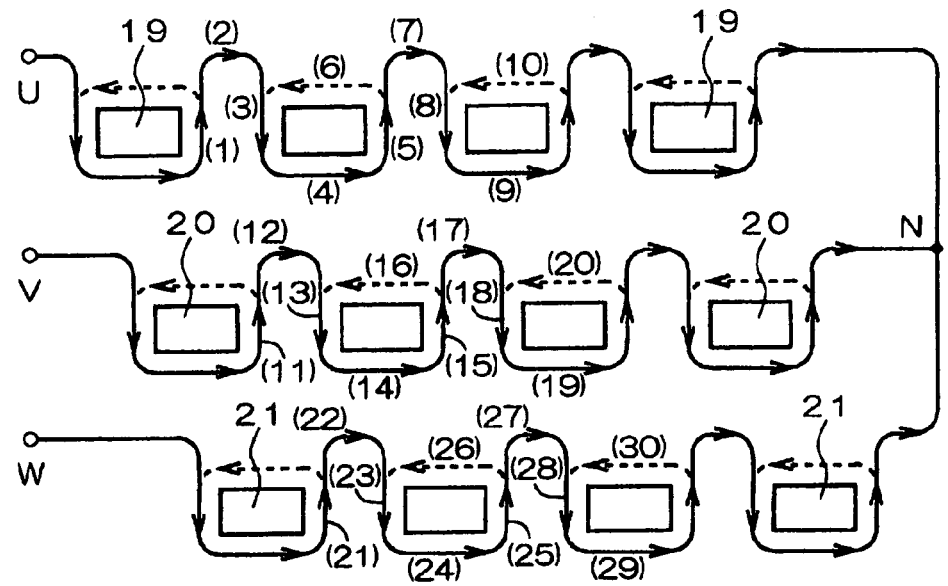
Figure 12:
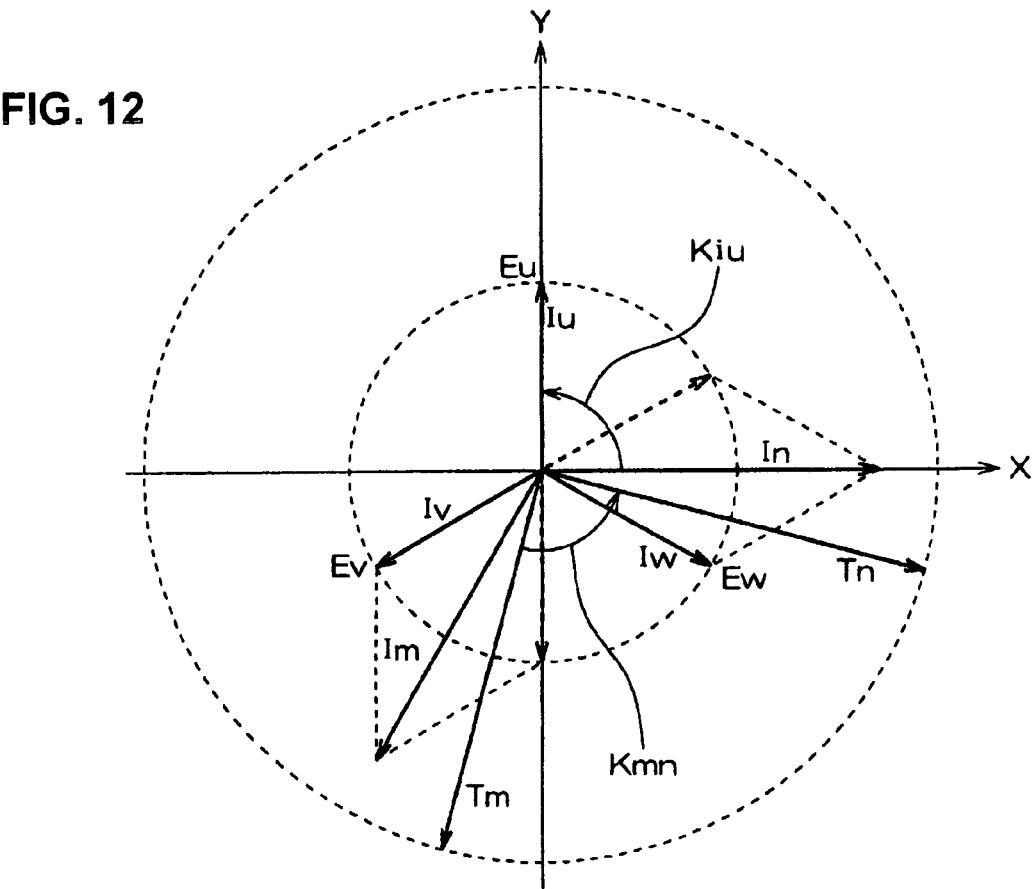
Figure 13:
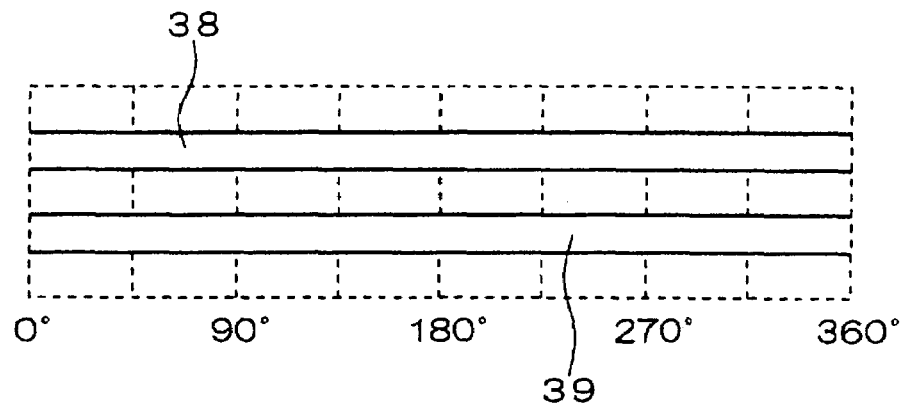
Figure 14:
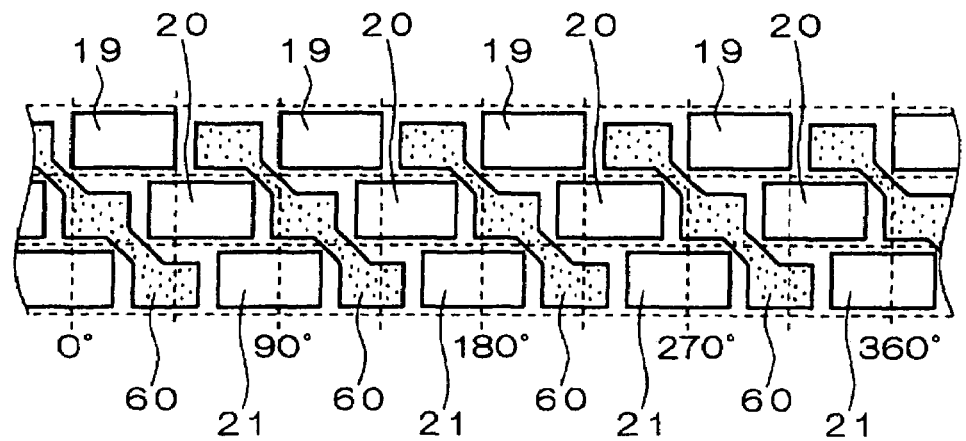
Figure 15:
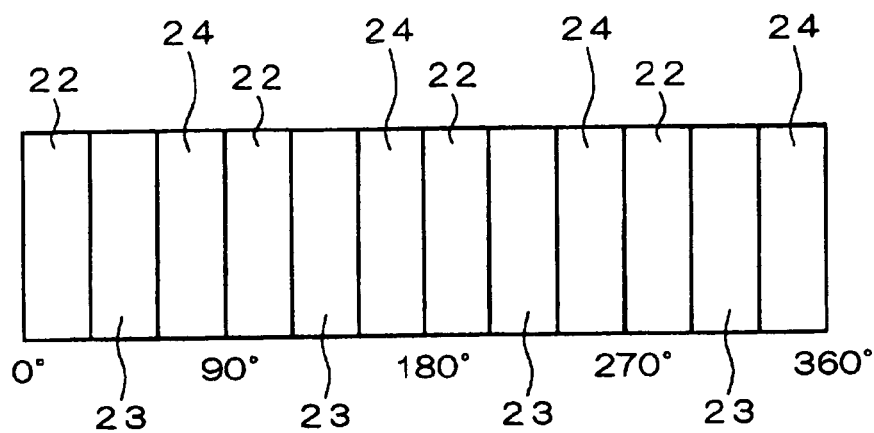
Figure 16:
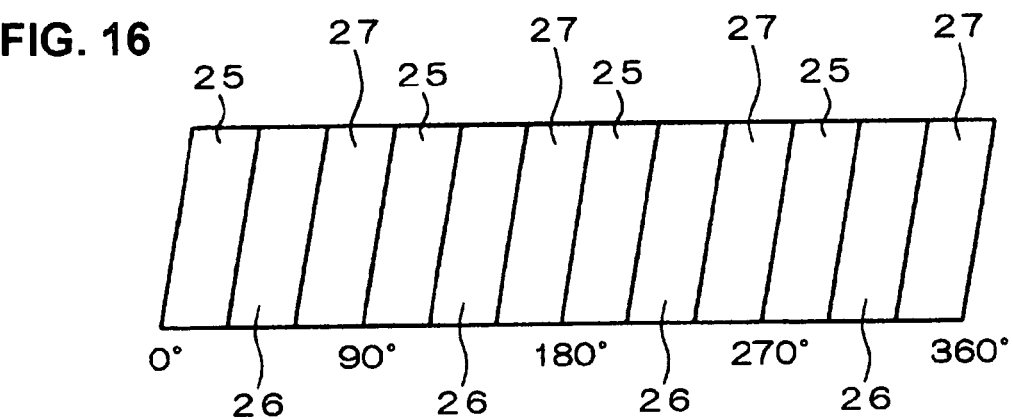
Figure 17:
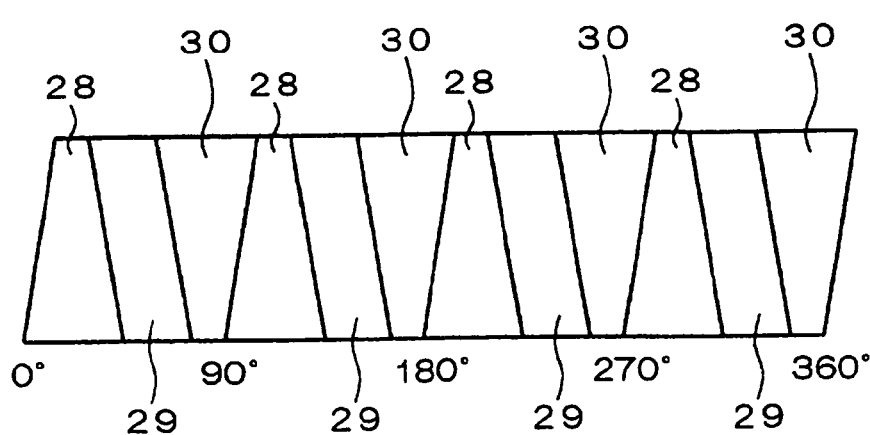
Figure 18:
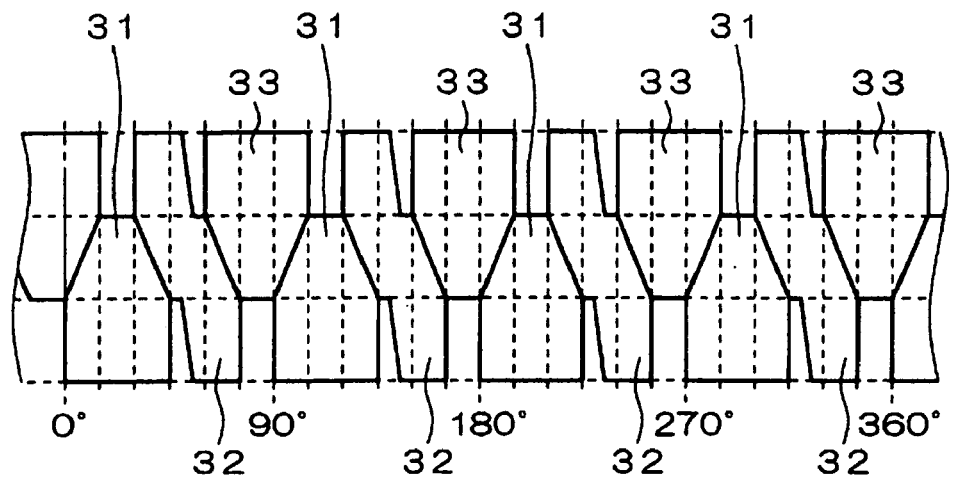
Figure 19:
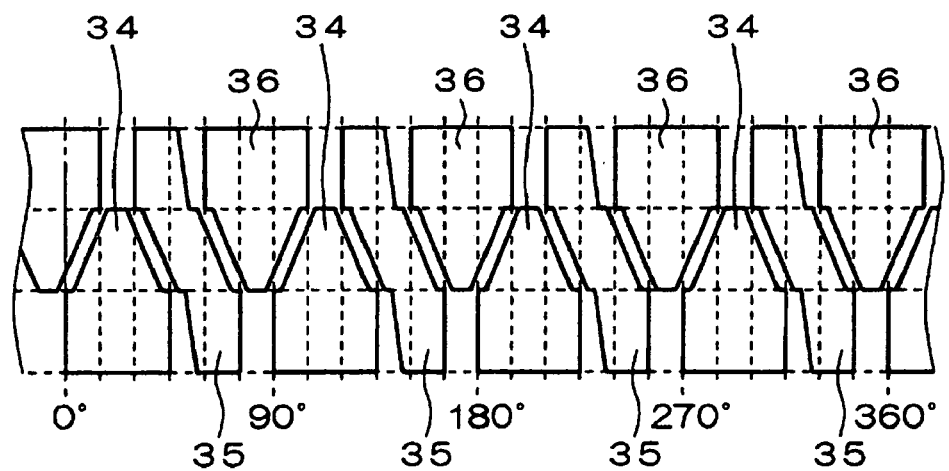
Figure 20:
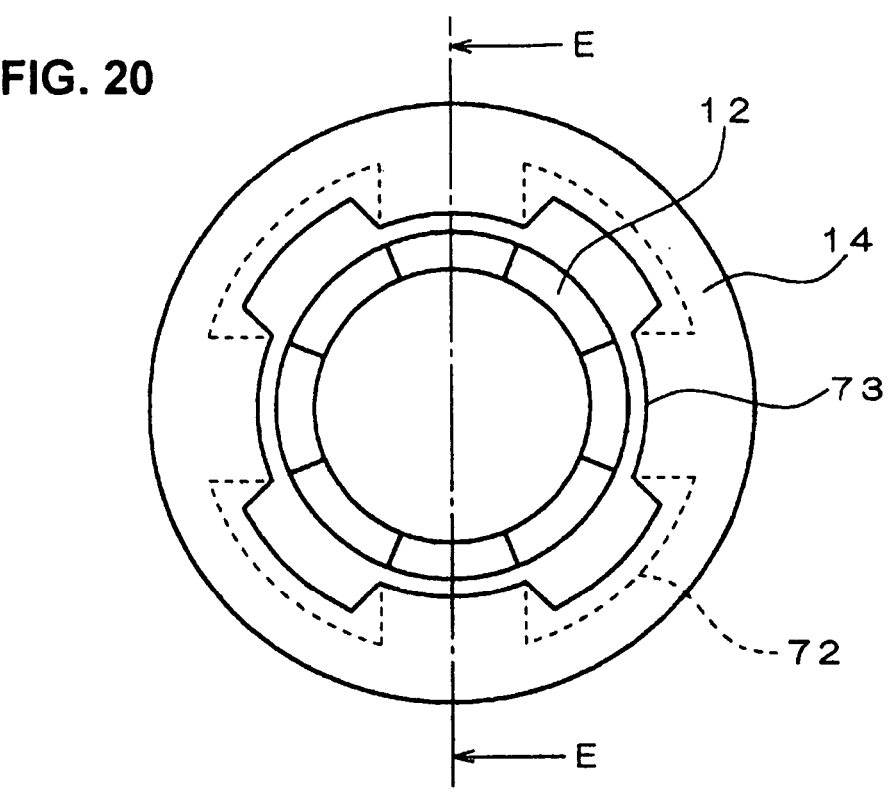
Figure 21:
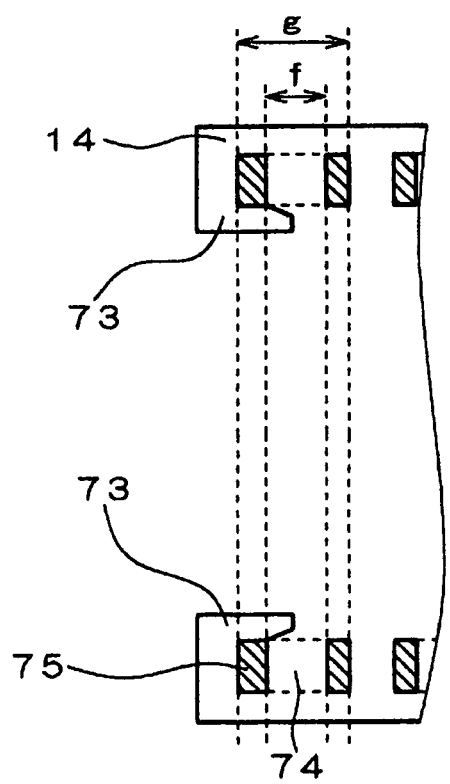
Figure 22:
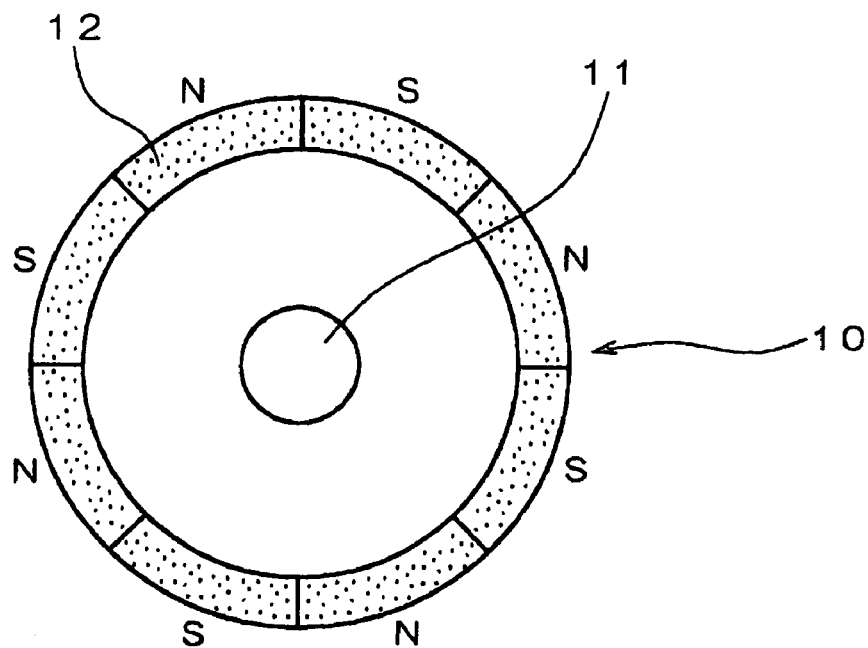
Figure 23:
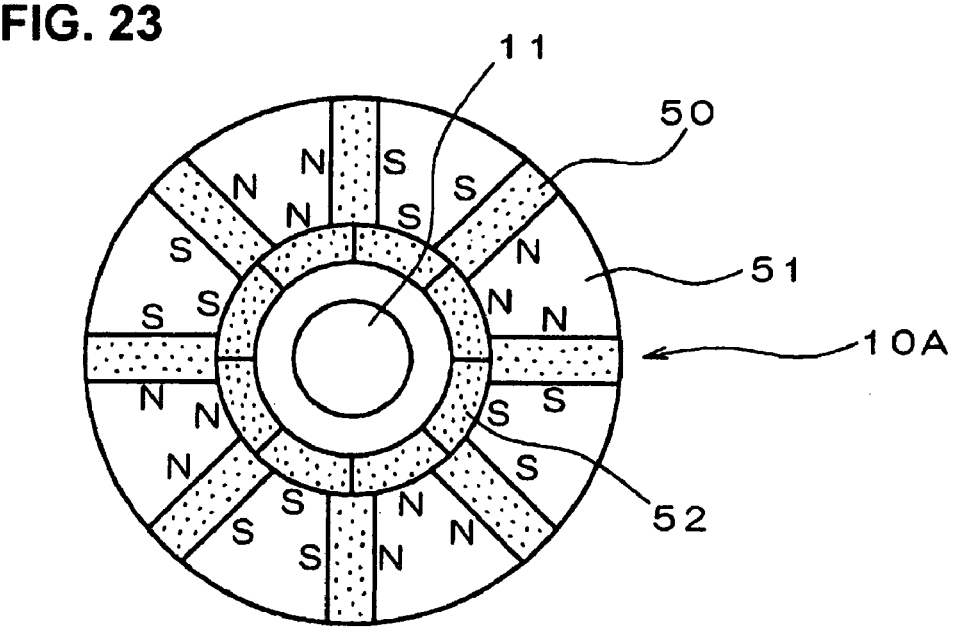
Figure 24:
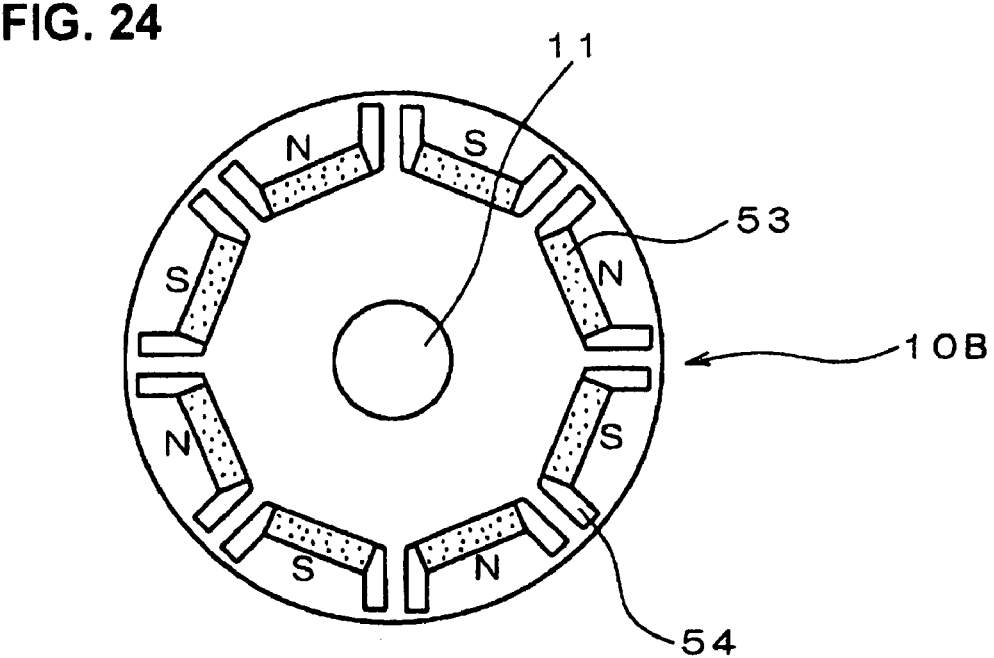
Figure 25:
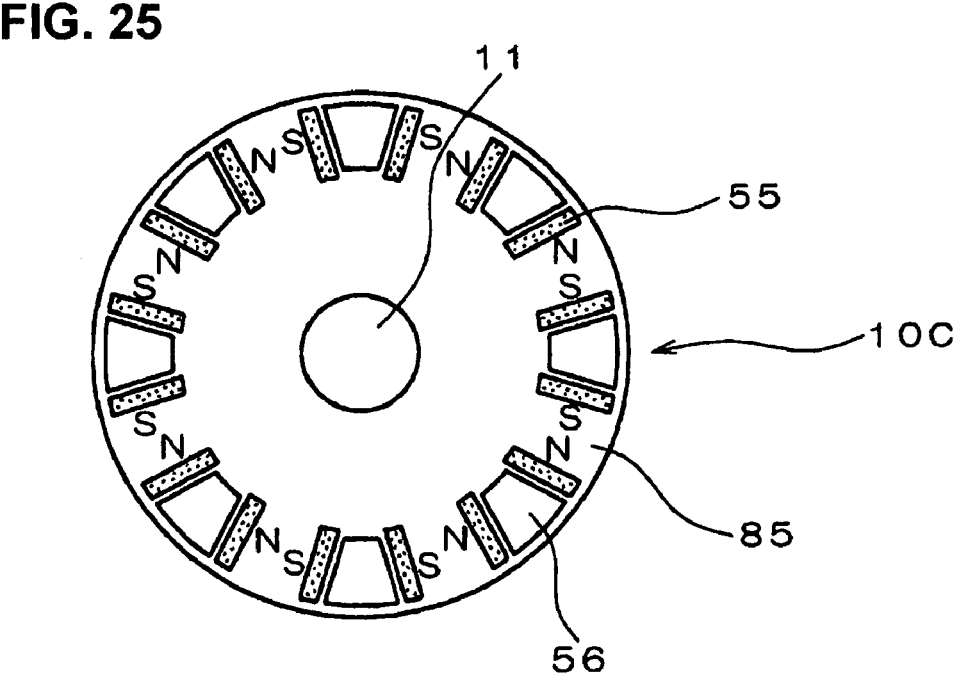
Figure 26:
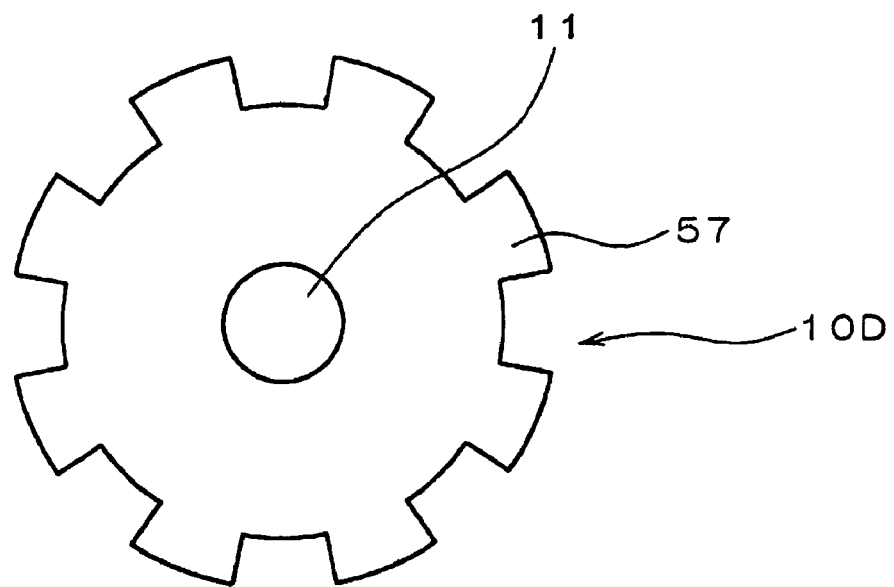
Figure 27:
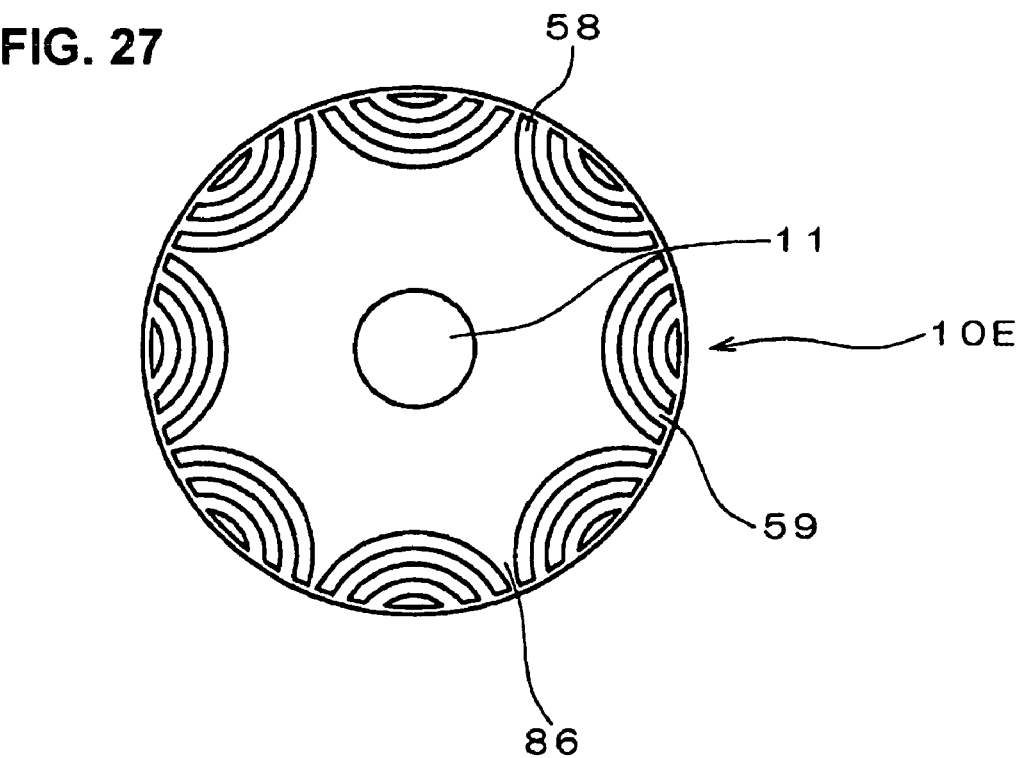
Figure 28:
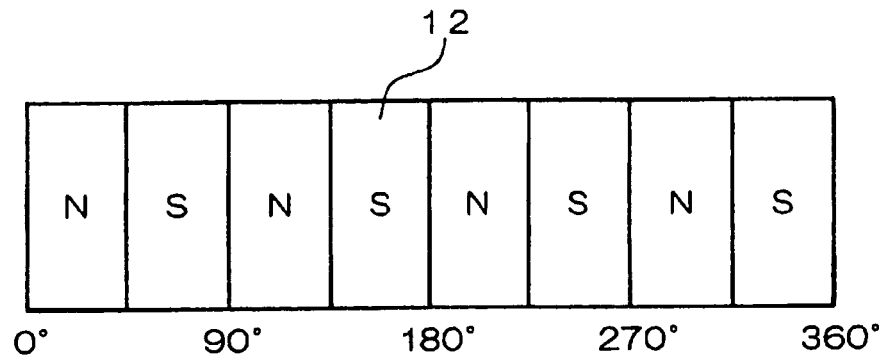
Figure 29:
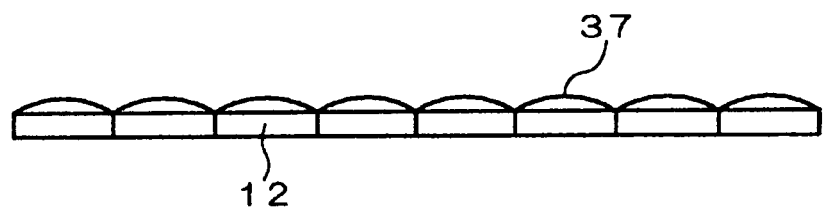
Figure 30:
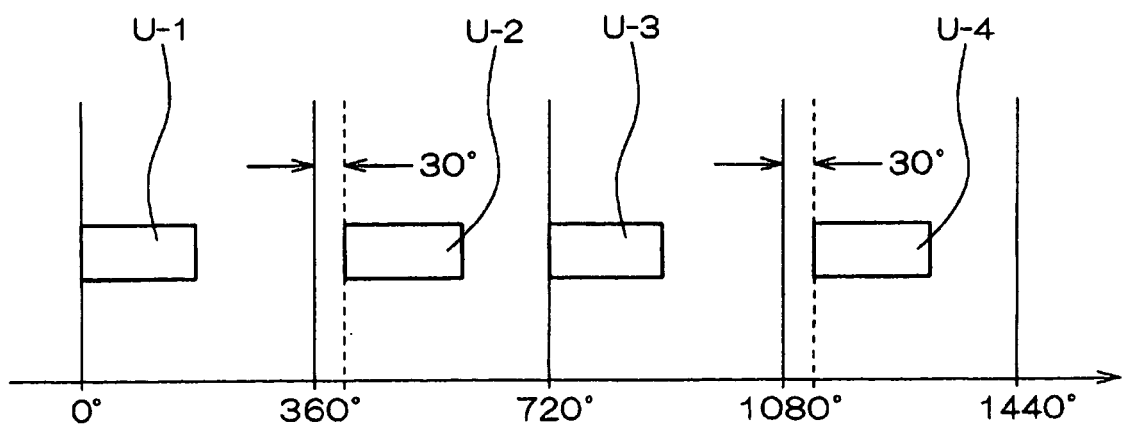
Figure 31:
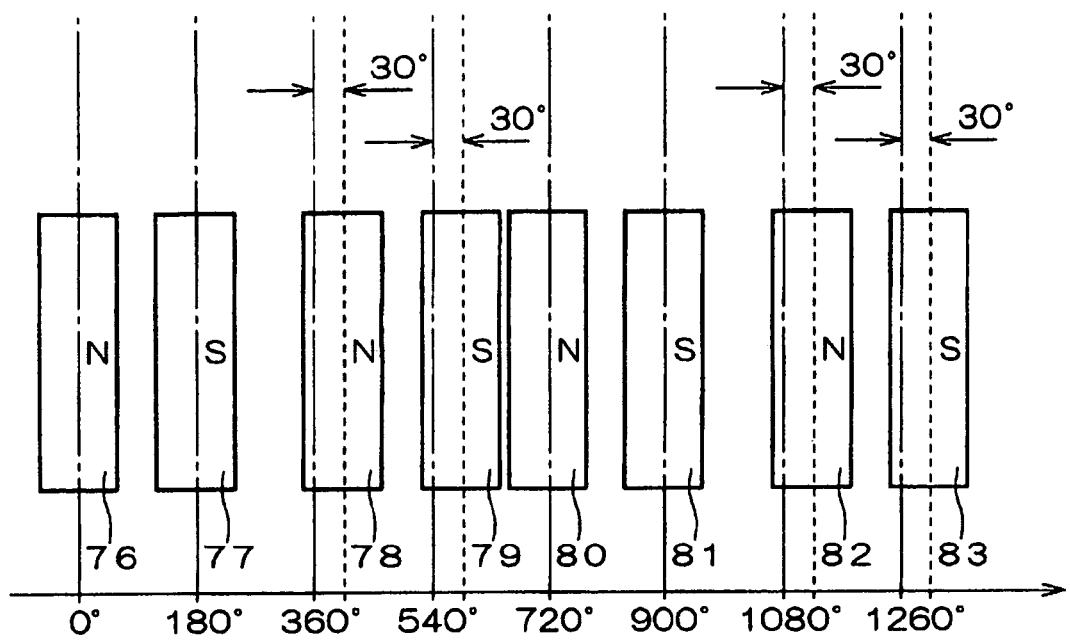
Figure 32:
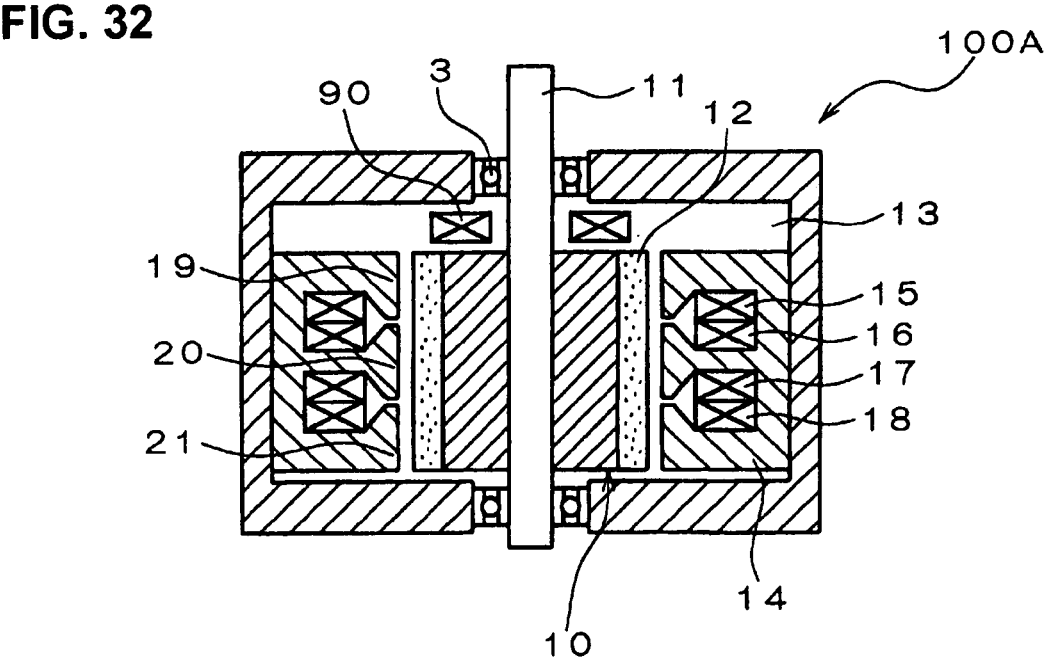
Figure 33:
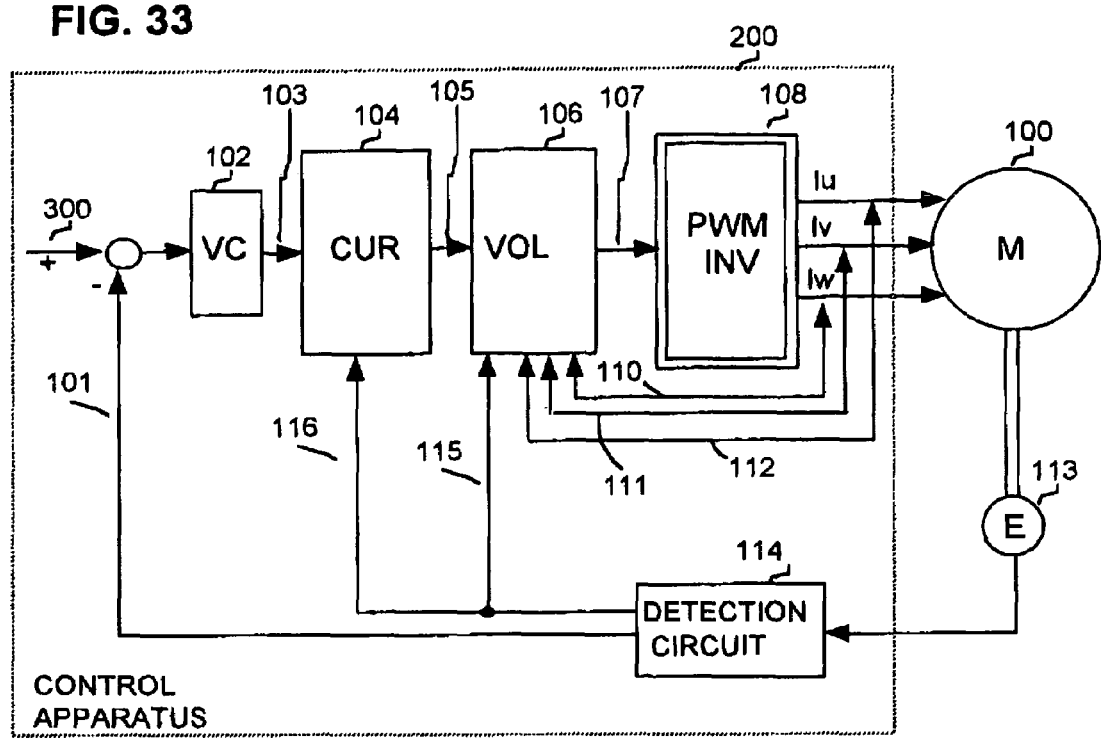
Figure 34:
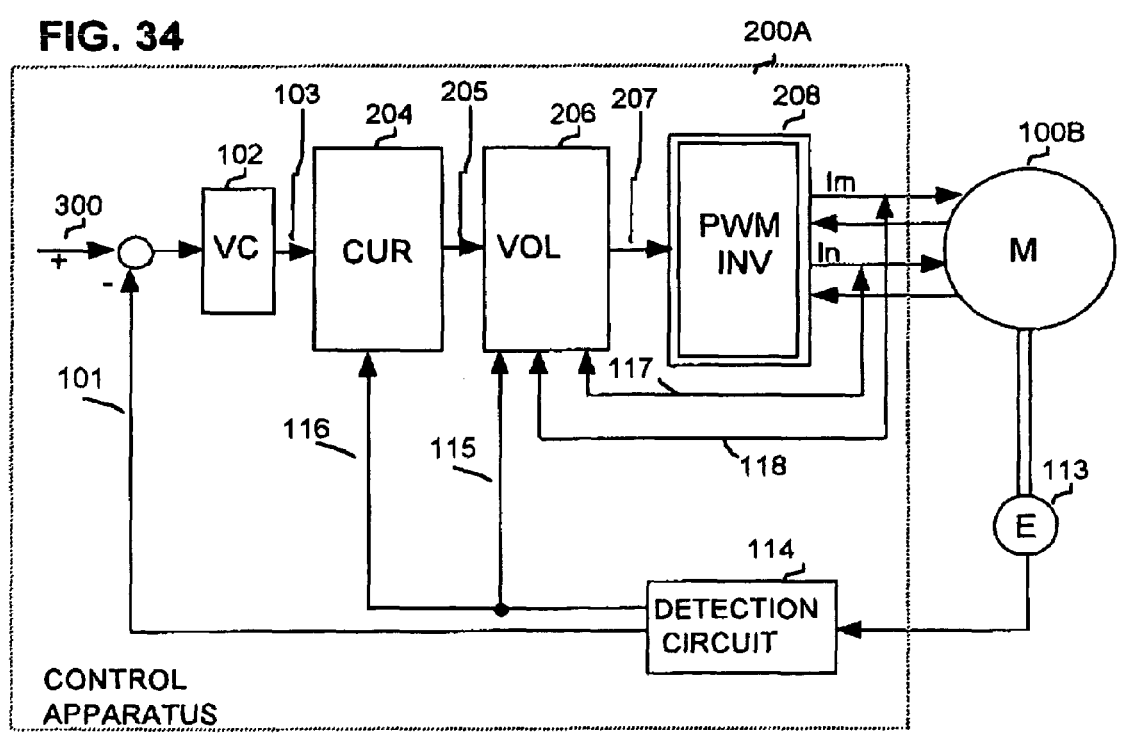
Figure 35:
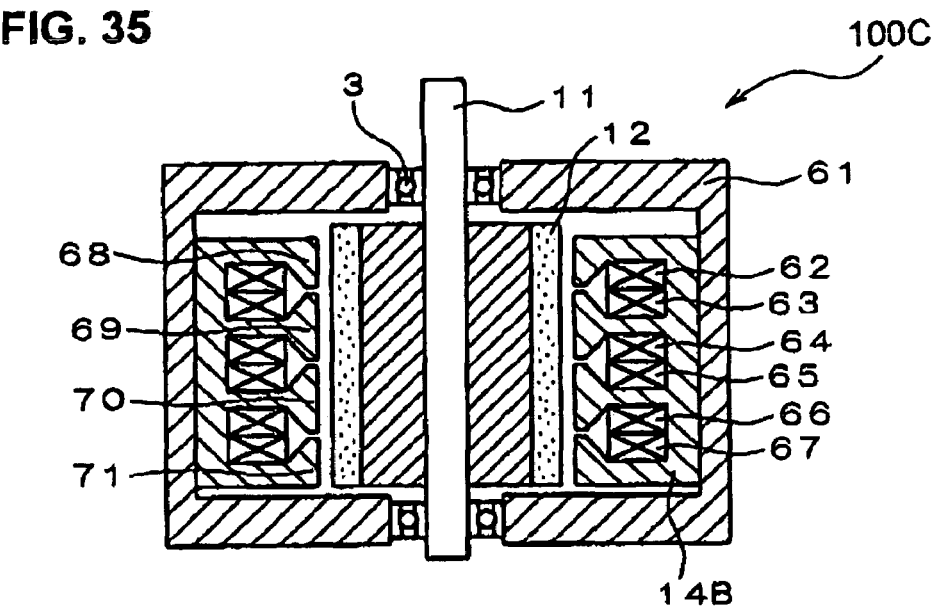
Figure 36:
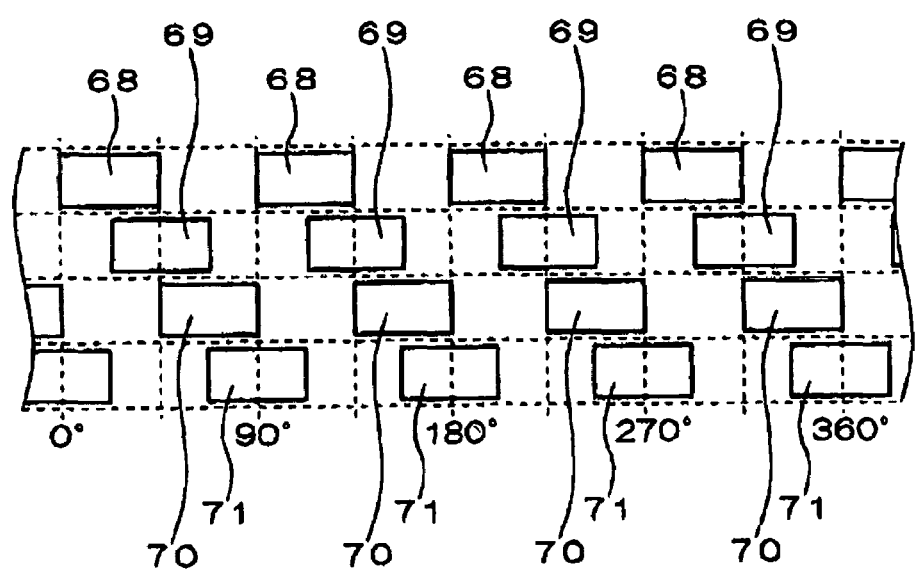
Figure 37:
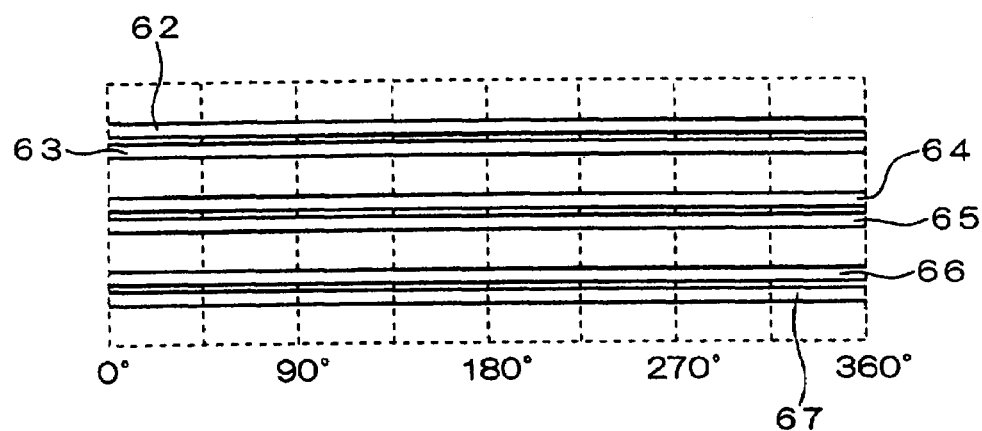
Figure 38:
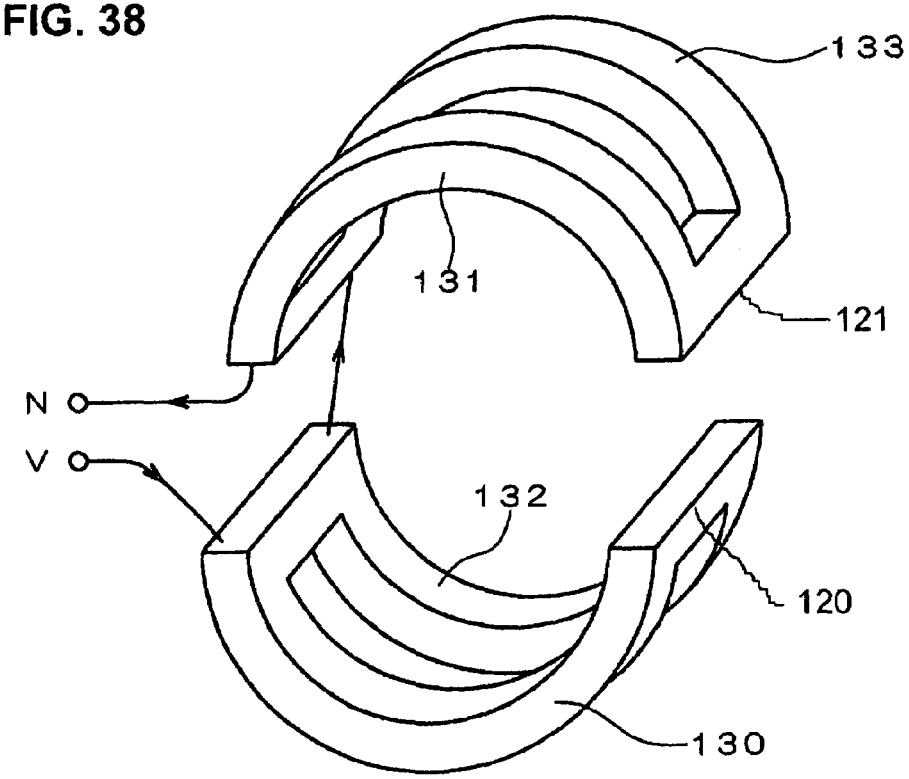
Figure 39:
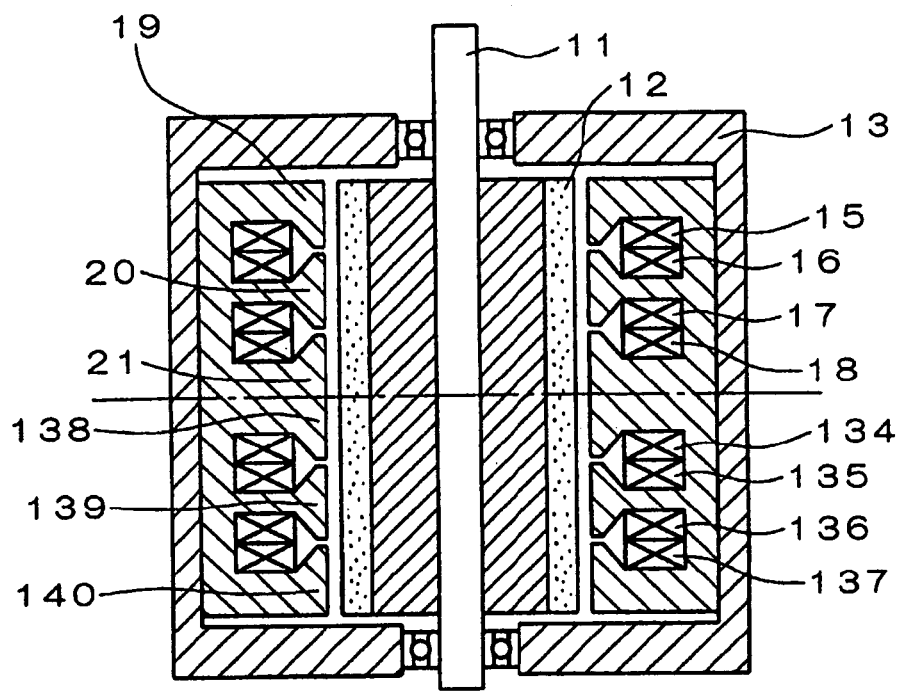
Figure 40:
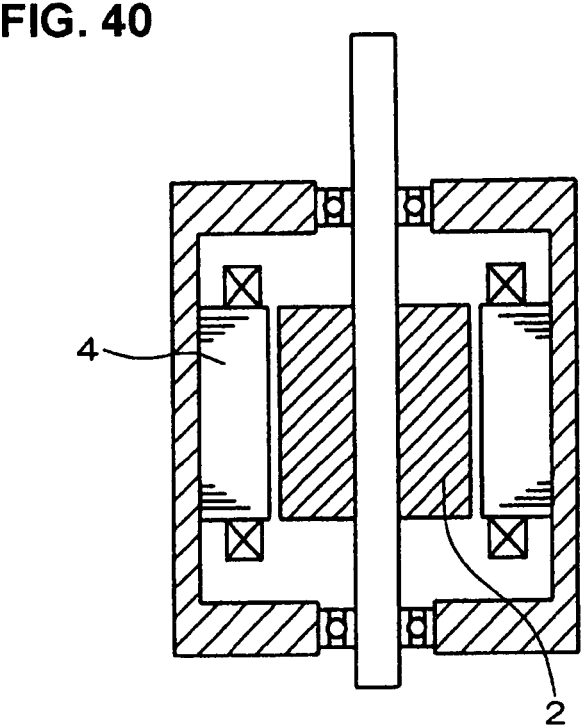
Figure 41:
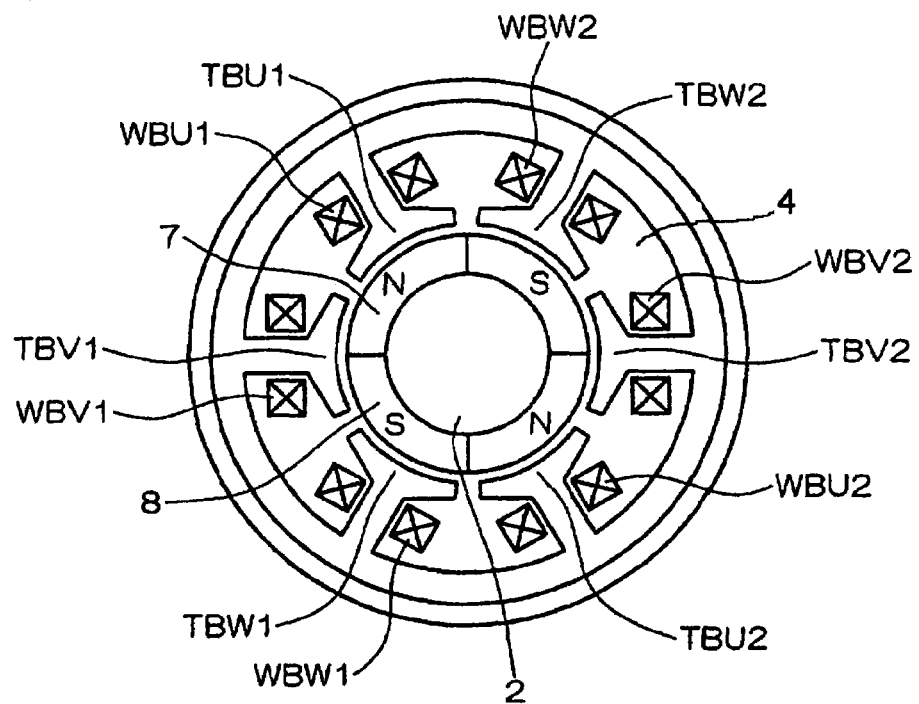
Figure 42:
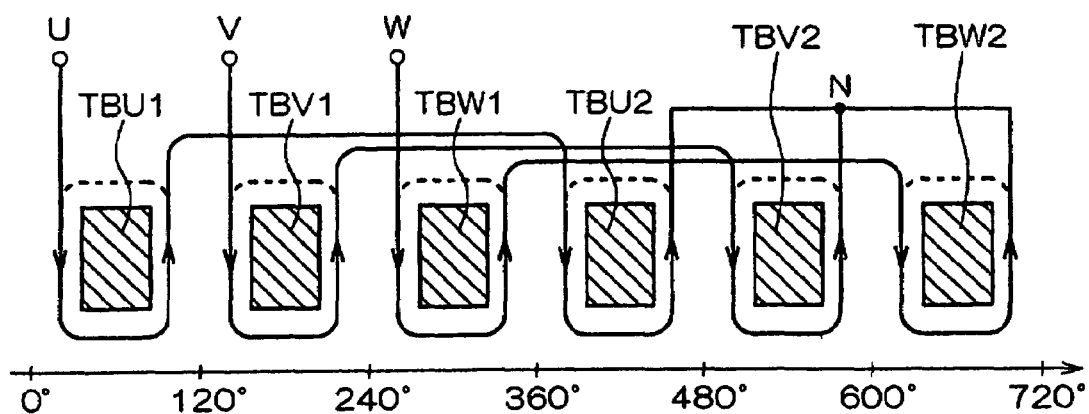
Figure 43:
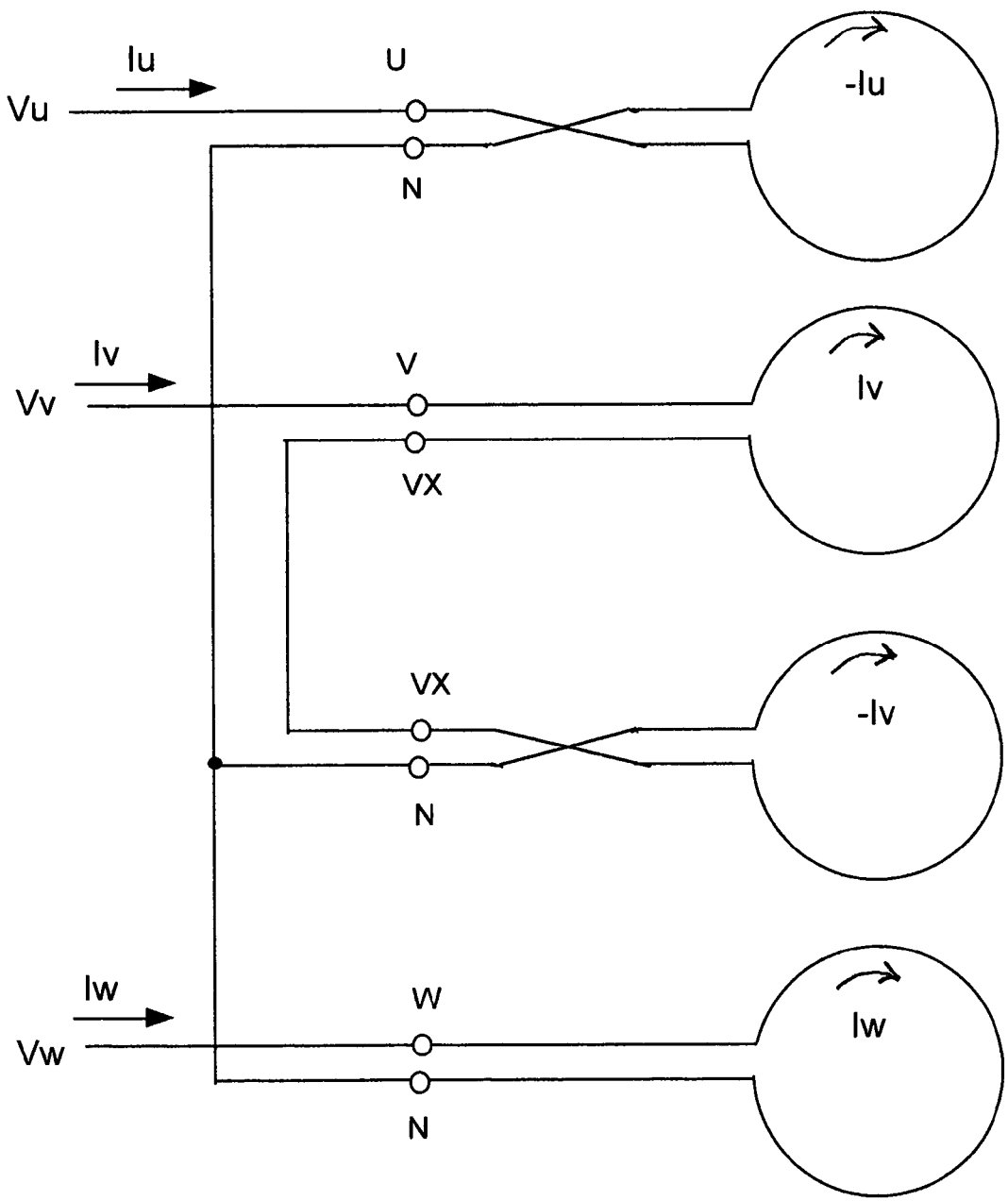
Figure 44:
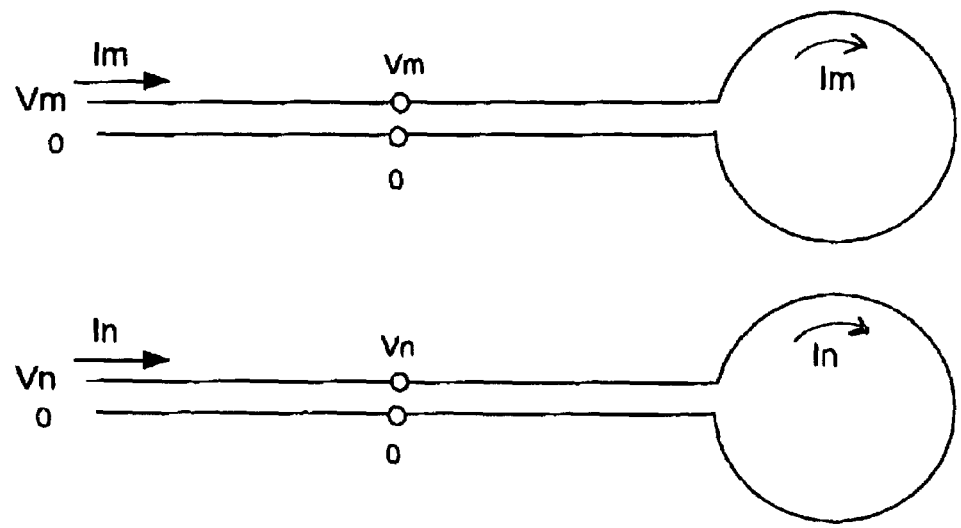
Figure 45:
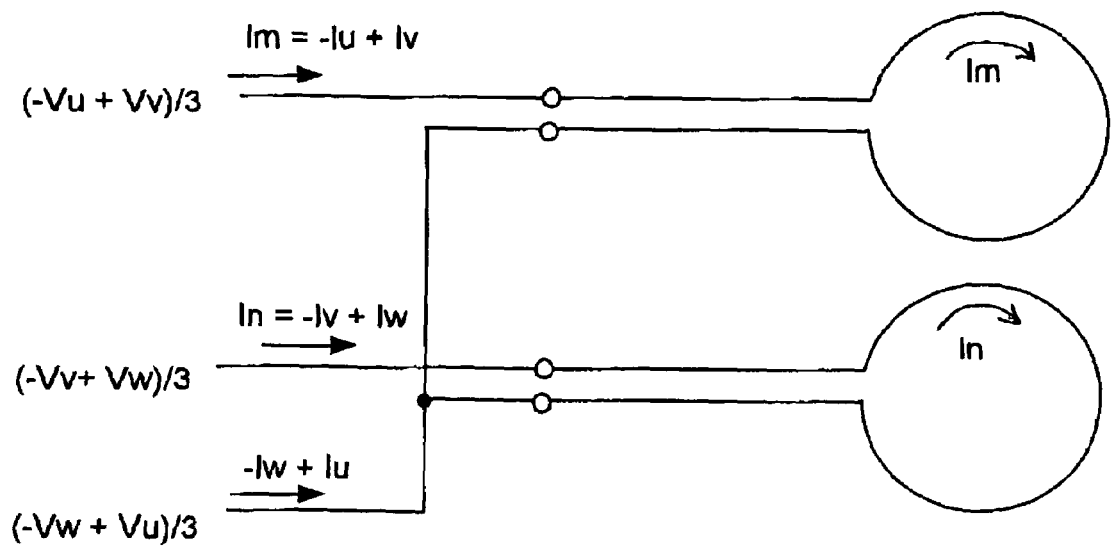
Figure 46:
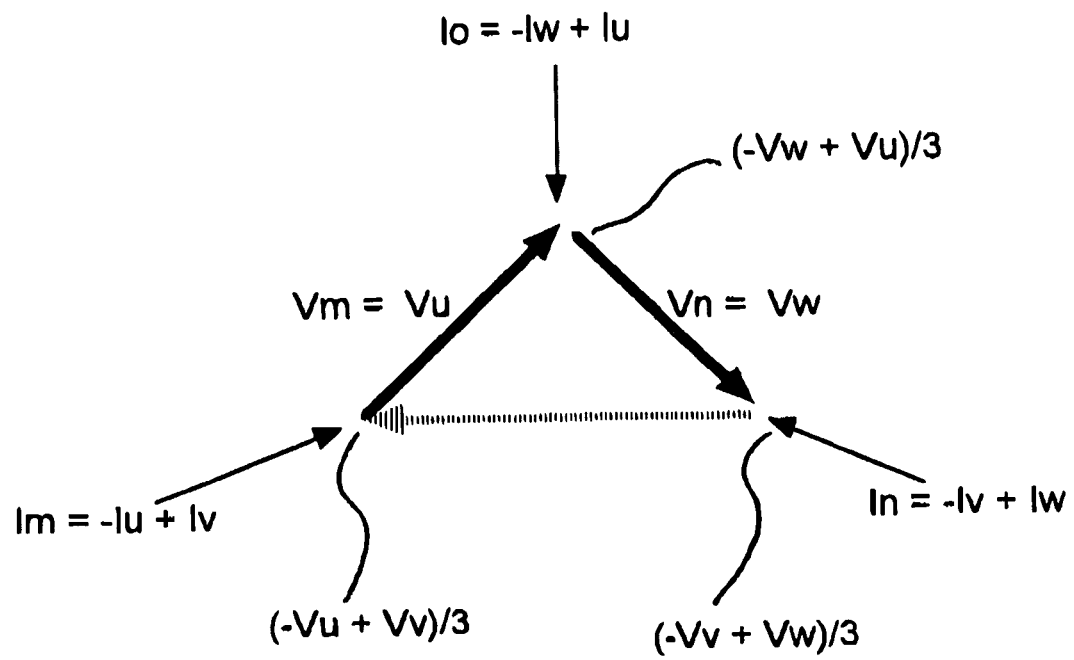

Delete Drawing Sheets 1-22 (Figs. 1-46) in their entirety.

Signed and Sealed this
Twenty-eighth Day of June, 2011

David J. Kappos
*Director of the United States Patent and Trademark Office*